US008225039B2

(12) United States Patent
Kawaguchi et al.

(10) Patent No.: US 8,225,039 B2
(45) Date of Patent: Jul. 17, 2012

(54) STORAGE CONTROLLER AND VIRTUAL VOLUME CONTROL METHOD

(75) Inventors: Yutaro Kawaguchi, Odawara (JP); Atsushi Ishikawa, Minamiashigara (JP); Katsuhiro Uchiumi, Fujisawa (JP)

(73) Assignee: Hitachi, Ltd., Toyko (JP)

( * ) Notice: Subject to any disclaimer, the term of this patent is extended or adjusted under 35 U.S.C. 154(b) by 306 days.

(21) Appl. No.: 12/666,645

(22) PCT Filed: Oct. 9, 2009

(86) PCT No.: PCT/JP2009/005297
§ 371 (c)(1),
(2), (4) Date: Dec. 23, 2009

(87) PCT Pub. No.: WO2011/042940
PCT Pub. Date: Apr. 14, 2011

(65) Prior Publication Data
US 2011/0191537 A1    Aug. 4, 2011

(51) Int. Cl.
*G06F 12/00* (2006.01)
(52) U.S. Cl. .. 711/114; 711/170; 711/203; 711/E12.002
(58) Field of Classification Search .................. 711/114, 711/112, 170, 162, 165, E12.002; 707/999.006
See application file for complete search history.

(56) References Cited

U.S. PATENT DOCUMENTS

| 6,240,494 | B1 | 5/2001 | Nagasawa et al. |
| 6,823,442 | B1 | 11/2004 | Cameron |
| 7,177,991 | B2 | 2/2007 | Yamamoto et al. |
| 7,461,196 | B2 | 12/2008 | Kawamura et al. |
| 7,590,664 | B2 * | 9/2009 | Kamohara et al. ..... 707/999.006 |
| 7,707,381 | B2 * | 4/2010 | Kobara .......................... 711/170 |
| 7,984,259 | B1 * | 7/2011 | English ......................... 711/165 |
| 2005/0216591 | A1 | 9/2005 | Sato |

(Continued)

FOREIGN PATENT DOCUMENTS

EP    0 926 585    6/1999

(Continued)

OTHER PUBLICATIONS

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.*

(Continued)

*Primary Examiner* — Pierre-Michel Bataille
(74) *Attorney, Agent, or Firm* — Mattingly & Malur, PC

(57) ABSTRACT

A storage system includes a virtual volume, a plurality of RAID groups, a pool unit for managing a plurality of first real storage areas and a controller. If a write command related to the virtual volume is issued from a higher-level device, the controller selects a prescribed second real storage area from among respective second real storage areas included in a prescribed first real storage area, and associates this prescribed second real storage area with a prescribed area inside the virtual volume corresponding to the write command, and which associates one virtual volume with one first real storage area. A migration destination determination unit selects a migration-targeted second real storage area from among the respective second real storage areas associated with the virtual volume, and selects a migration-destination first real storage area, which is to become the migration destination of data stored in the migration-targeted second real storage area.

14 Claims, 32 Drawing Sheets

U.S. PATENT DOCUMENTS

| | | | |
|---|---|---|---|
| 2007/0239954 A1* | 10/2007 | Sakashita et al. | 711/165 |
| 2007/0245114 A1 | 10/2007 | Kakui et al. | |
| 2008/0177947 A1* | 7/2008 | Eguchi et al. | 711/165 |
| 2008/0235448 A1 | 9/2008 | Inoue et al. | |
| 2008/0270720 A1* | 10/2008 | Tanabe et al. | 711/162 |
| 2010/0293412 A1* | 11/2010 | Sakaguchi et al. | 711/162 |
| 2011/0060885 A1* | 3/2011 | Satoyama et al. | 711/170 |

FOREIGN PATENT DOCUMENTS

| | | |
|---|---|---|
| EP | 1 770 502 | 4/2007 |
| EP | 1 857 918 | 11/2007 |
| JP | 2007-310861 | 11/2007 |
| JP | 2008-234158 | 10/2008 |
| WO | WO 2010106574 A1 * | 9/2010 |

OTHER PUBLICATIONS

International Search Report in International Application No. PCT/JP2009/005297 issued May 4, 2010.

European Search Report received in Application No. 12152089, Apr. 5, 2012, 7 pp., European Patent Office.

* cited by examiner

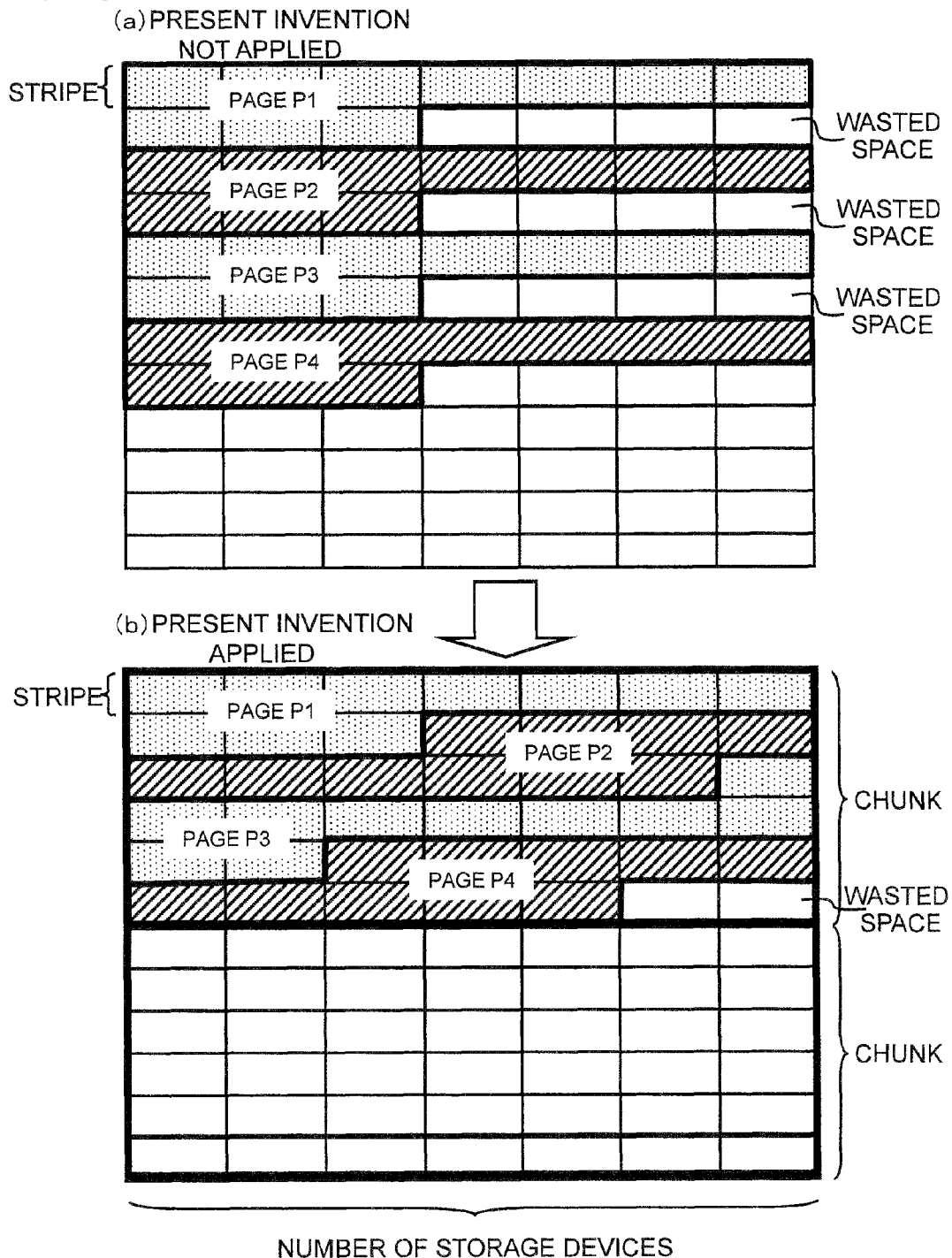

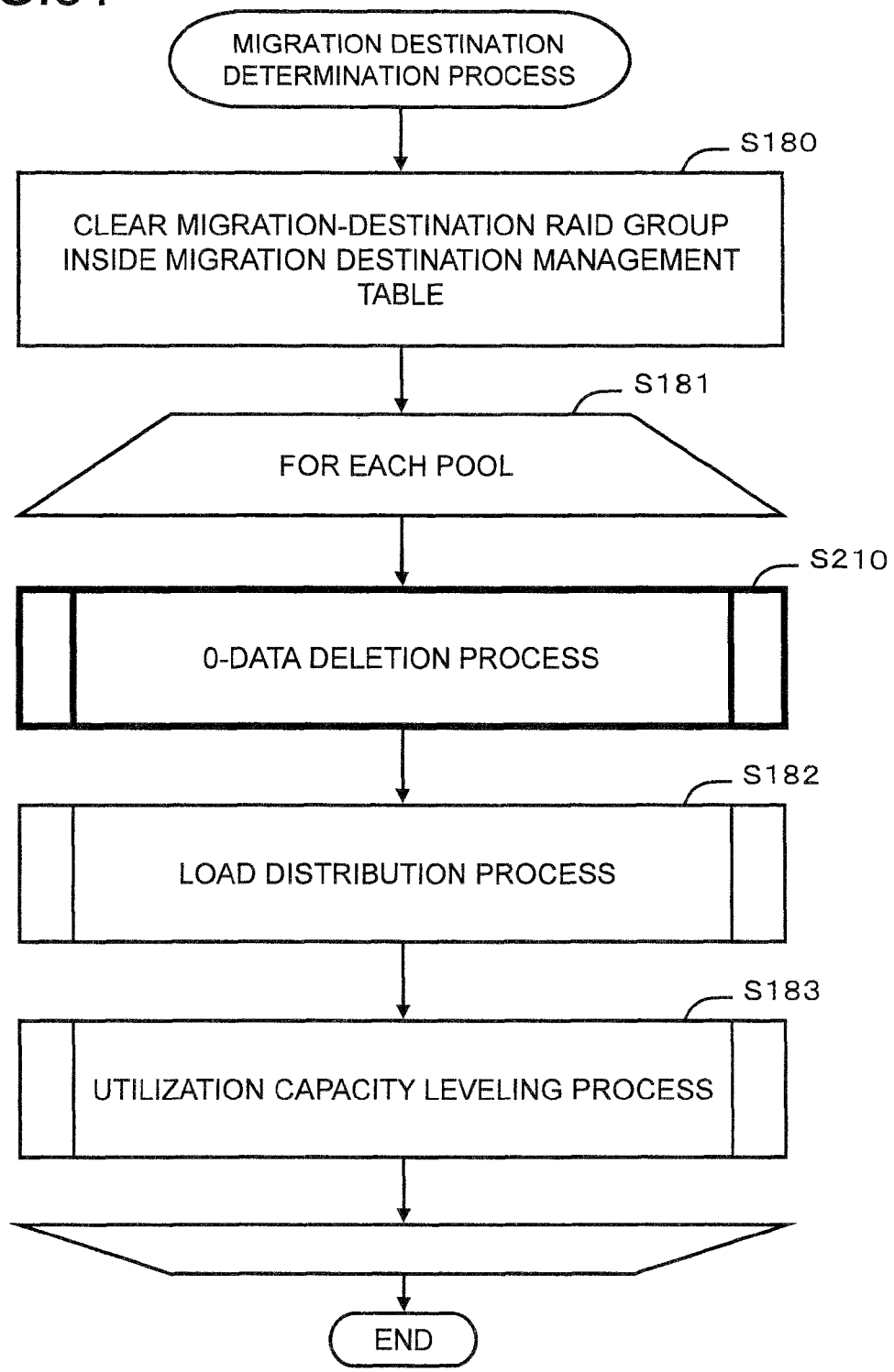

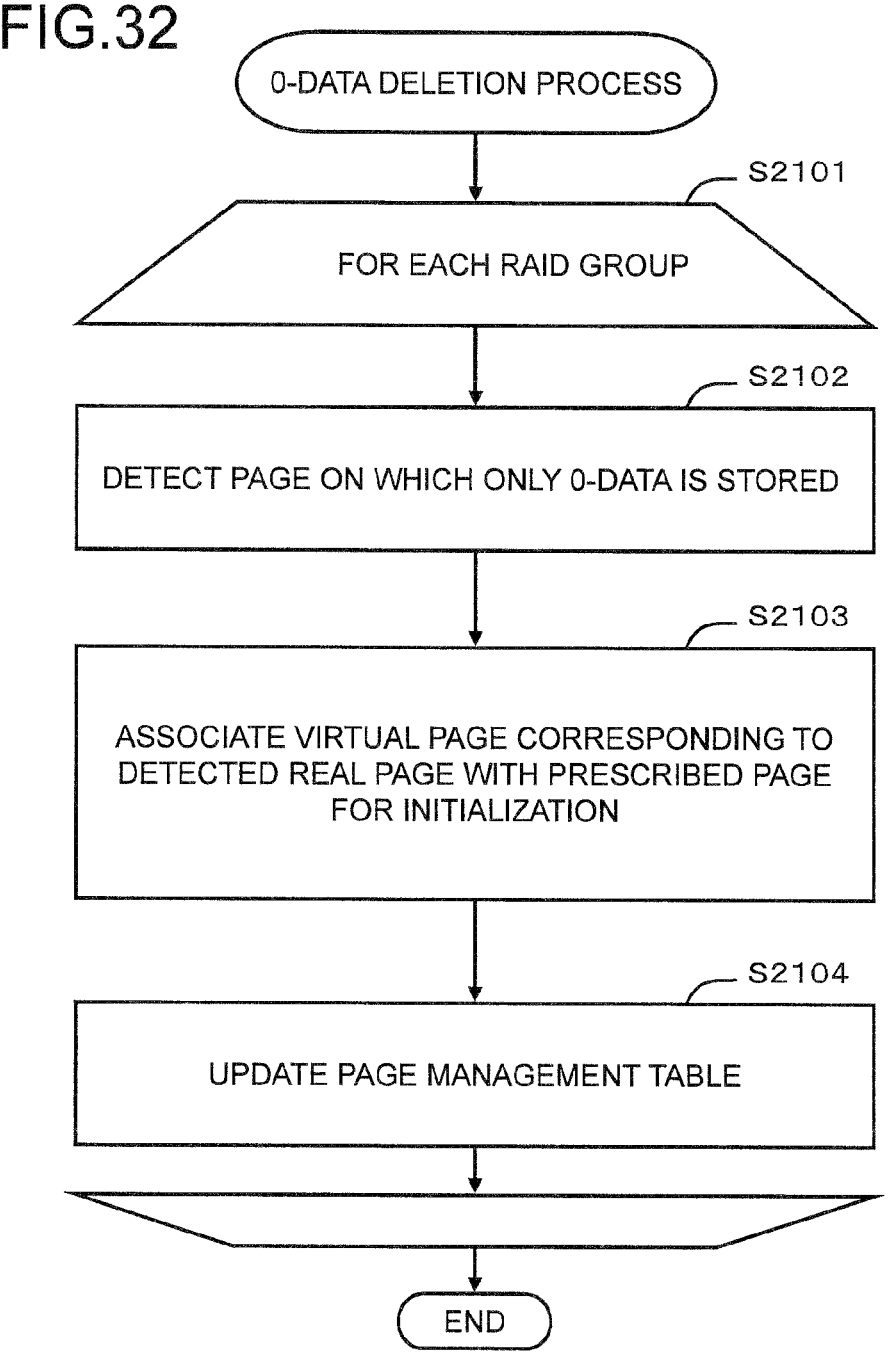

STORAGE CONTROLLER AND VIRTUAL VOLUME CONTROL METHOD

This application is a National Stage Entry of PCT/JP2009/005297, filed Oct. 9, 2009.

TECHNICAL FIELD

The present invention relates to a storage controller and a virtual volume control method.

BACKGROUND ART

Users, such as companies and the like, utilize storage controllers to manage data. The storage controller forms a logical volume on a storage area on the basis of RAID (Redundant Array of Independent Disks). This logical volume is provided to a host computer (hereinafter, host).

The amount of data being used by users is increasing on a daily basis, and volume sizes established to meet the situation as it stands now do not provide enough capacity. By contrast, in cases where the volume size is set larger than the size currently required in anticipation of increases in data, many nonessential disk drives result, raising costs.

Accordingly, technologies for preparing a virtual logical volume and allocating a real storage area to the virtual logical volume in accordance with actual use have been proposed (Patent Literature 1 and Patent Literature 2). Furthermore, in order to prevent the uneven distribution in a specific real volume of real storage areas that have been allocated to the virtual logical volume, technology for reallocating data is also known (Patent Literature 3).

CITATION LIST

Patent Literature

[PTL 1]
Specification of U.S. Pat. No. 6,823,442
[PTL 2]
Japanese Patent Application Laid-open No. 2007-310861
[PTL 3]
Japanese Patent Application Laid-open No. 2008-234158

SUMMARY OF INVENTION

Technical Problem

In the above-mentioned literature (U.S. Pat. No. 6,823,442B1), in a case where a write request related to a block address on a virtual volume has been received, a storage server system allocates a logical data page to a virtual volume page address corresponding to this block address. Then, data is written to this logical data page.

In the above-mentioned literature, there is disclosed a management method for configuring a logical disk having a specific RAID level based on the concept of an area called a chunklet, which is obtained from an area on a plurality of physical disks.

However, this management method differs completely from the physical area management method of the storage controller, which configures a RAID group in physical disk drive units. Therefore, it is not possible to apply the management method disclosed in the above-mentioned literature as-is in a storage controller that configures a RAID group in physical disk drive units.

Hypothetically, in a case where the technology disclosed in the above-mentioned literature is applied to the above-mentioned management method, a problem arises in that, for a storage controller that is able to provide both a normal logical volume and a virtual logical volume, the management method for each physical area will differ in accordance with the normal logical volume and the virtual logical volume, making the storage controller architecture complicated. As used here, normal logical volume signifies a logical volume to which a physical area (a physical storage area) of the same capacity as the size of this volume is allocated beforehand at volume creation. A virtual logical volume is a logical volume for which the volume size has been virtualized, and signifies a logical volume to which a physical area is allocated in accordance with a write request.

That is, in a case where it is supposed that the technology disclosed in the above-mentioned literature has been applied to a storage controller that configures a RAID group in physical disk drive units, a physical area would have to be managed using a plurality of different management methods, making the configuration complex and increasing development costs as well.

Furthermore, in the above-mentioned literature, in a case where a table page corresponding to the virtual volume page address is not allocated when a write request is received, first of all, the storage server system initially allocates a table page, and next allocates the logical data page. Therefore, in the technology disclosed in the above-mentioned literature, the problem is that the data page must be allocated after allocating the table page, thereby lowering the performance of the write process.

Furthermore, in the above-mentioned literature, the carrying out of an allocation process like that described above requires that a dedicated pool of data pages and a dedicated pool of table pages each be provided separately, making the system architecture complex.

Accordingly, an object of the present invention is to provide a storage controller and a virtual volume control method that make it possible to efficiently associate a storage area with a virtual volume taking into account the physical configuration of the RAID group. Another object of the present invention is to provide a storage controller and a virtual volume control method that make it possible to configure a virtual volume by making uniform use of the respective RAID groups. Yet another object of the present invention is to provide a storage controller and a virtual volume control method that make it possible to efficiently associate a storage area with a virtual volume, and, in addition, make it possible to improve the response performance of the virtual volume. Yet other objects of the present invention should become clear from the disclosure of the embodiments described below.

Solution to Problem

To solve the problems cited above, a storage controller in accordance with a first aspect of the present invention comprises: a virtual volume that is formed virtually; a plurality of RAID groups including either one or a plurality of storage devices; a pool unit for managing a plurality of first real storage areas, which are respectively disposed in a stripe shape in each of the RAID groups, and which have has a plurality of second real storage areas respectively; a controller, which, in a case where a write command related to the virtual volume is issued from a higher-level device, selects a prescribed second real storage area from among the respective second real storage areas included in a prescribed first real storage area of the respective first real storage areas, and associates this prescribed second real storage area with a prescribed area inside the virtual volume corresponding to the write command, and which associates one virtual volume with one first real storage area; a migration-destination determination unit, which selects a migration-targeted second real storage area from among the respective second real storage areas associated with the virtual volume, and selects a migration-destination first real storage area, which is to become the migration destination of data stored in the migration-targeted second real storage area, from among the respective first real storage areas inside another RAID group other than the RAID group in which the migration-targeted second real storage area of the respective first real storage areas is disposed; a migration-destination storage unit which associates the migration-targeted second real storage area with the migration-destination first real storage area, and stores the migration-targeted second real storage area associated with the migration-destination first real storage area; and a command processor, which, in a case where the higher-level device has issued a command corresponding to the migration-targeted second real storage area, migrates, during command processing, the data stored in the migration-targeted second real storage area to the migration-destination first real storage area stored by the migration-destination storage unit.

In a second aspect according to the first aspect, the migration-destination storage unit stores migration-targeted information specifying the migration-targeted second real storage area, migration-destination information specifying the migration-destination first real storage area, load information related to a load of each of the RAID groups, and utilization capacity information related to the utilization capacity of each of the RAID groups, the migration-destination determination unit, in a case in which either a prescribed time has arrived or an instruction has been issued from the user, deletes the migration-destination information stored in the migration-destination storage unit, frees, from among the respective second real storage areas, the second real storage area in which only NULL data is stored, and changes same to an unused second real storage area, and furthermore executes a load distribution process, which is based on the load information, and which creates new migration-destination information for migrating a relatively high-load second real storage area to a relatively low-load first real storage area and stores same in the migration-destination storage unit, and executes a utilization capacity leveling process, which is based on the utilization capacity information, and which creates new migration-destination information for migrating a second real storage area inside a first real storage area that has a relatively large utilization capacity to a first real storage area that has a relatively small utilization capacity and stores same in the migration-destination storage unit, and the command processor, in a case where a write command with respect to the migration-targeted second real storage area has been issued from the higher-level device, reads out the data stored in the migration-targeted second real storage area, merges this read-out data with write data related to the write command, and writes this merged data into a second real storage area inside the migration-destination first real storage area, and furthermore, notifies the higher-level device to the effect that write command processing has been completed, and in a case where a read command with respect to the migration-targeted second real storage area has been issued from the higher-level device, reads out the data from the migration-targeted second real storage area and sends this data to the higher-level device, and after notifying the higher-level device to the effect that the read command processing has been completed, writes the data that has been read out from the migration-targeted second real storage area to a second real storage area inside the migration-destination first real storage area.

In a third aspect according to the first aspect, the command processor, in a case where a write command with respect to the migration-targeted second real storage area has been issued from the higher-level device, reads out the data stored in the migration-targeted second real storage area, merges this read-out data with write data related to the write command, and writes this merged data into a second real storage area inside the migration-destination first real storage area.

In a fourth aspect, the command processor, in a case where a read command with respect to the migration-targeted second real storage area has been issued from the higher-level device, reads out the data from the migration-targeted second real storage area and sends this data to the higher-level device, and after notifying the higher-level device to the effect that processing of the read command has been completed, writes the data that has been read out from the migration-targeted second real storage area to a second real storage area inside the migration-destination first real storage area.

In a fifth aspect according to the third aspect, the migration-destination storage unit stores: migration-targeted information specifying the migration-targeted second real storage area; migration-destination information specifying the migration-destination first real storage area; and load information related to a load of each the RAID group, and the migration-destination determination unit deletes the migration-destination information stored in the migration-destination storage unit, creates, based on the load information, new migration-destination information for migrating a relatively high-load second real storage area to a relatively low-load first real storage area, and stores same in the migration-destination storage unit.

In a sixth aspect according to the third aspect, the migration-destination storage unit stores: migration-targeted information specifying the migration-targeted second real storage area; migration-destination information specifying the migration-destination first real storage area; load information related to a load of each the RAID group, and utilization capacity information related to a utilization capacity of each the RAID group, and the migration-destination determination unit deletes the migration-destination information stored in the migration-destination storage unit, creates, based on the load information, new migration-destination information for migrating a relatively high-load second real storage area to the inside of a relatively low-load first real storage area, and stores same in the migration-destination storage unit, and furthermore, creates, in order to migrate a second real storage area inside a first real storage area that has a relatively large utilization capacity to a first real storage area that has a relatively small utilization capacity, new migration-destination information based on the utilization capacity information, and stores same in the migration-destination storage unit.

In a seventh aspect according to the fifth aspect, the migration-destination determination unit, subsequent to deleting the migration-destination information stored in the migration-destination storage unit, frees, from among the respective second real storage areas, the second real storage area in which only NULL data is stored, and changes same to an unused second real storage area.

In an eighth aspect, the migration-destination determination unit selects a plurality of migration-targeted second real storage areas in first real storage area units.

In a ninth aspect, when creating a virtual volume, the controller, in a case of creating the virtual volume, associates respective virtual storage areas inside the virtual volume with a second real storage area for initialization use in which initial data is stored, and in a case where the write command related to the virtual volume has been issued from the higher-level device, switches the association destination of the virtual storage area corresponding to the write command from the second real storage area for initialization use to a selected prescribed second real storage area.

In a tenth aspect, the controller associates the unused second real storage area, which follows the second real storage area associated with the virtual volume in accordance with a previous write request, with the virtual volume as the prescribed second real storage area.

In an eleventh aspect, a guarantee code is set in the data stored in the virtual volume for each prescribed size, and the guarantee code comprises data for identifying the RAID group, data for identifying the first real storage area, and data for identifying the second real storage area inside the first real storage area.

A virtual volume control method according to a twelfth aspect is a method for controlling a virtual volume to which a real storage area is allocated in accordance with a write command, with the virtual volume having a plurality of virtual storage areas, and a pool unit for managing a plurality of RAID groups being created, and furthermore each the RAID group having a plurality of first real storage areas each having a stripe shape so as to span a plurality of storage devices, and having a plurality of second real storage areas corresponding to the virtual storage areas, the method comprising: in a case where a write command related to the virtual volume has been issued from a higher-level device, associating a prescribed second real storage area included in a prescribed first real storage area of the respective first real storage areas with the virtual storage area corresponding to the write command so that a plurality of the virtual volumes are not associated with one first real storage area; storing write data received from the higher-level device in the prescribed second real storage area to be associated with the virtual storage area; selecting a relatively high-load second real storage area from among the respective second real storage areas associated with the virtual storage areas as a migration-targeted second real storage area; selecting, as a migration-destination first real storage area that is be the migration destination of data stored in the migration-targeted second real storage area, a first real storage area, which is one of respective first real storage areas inside another RAID group other than the RAID group where the migration-targeted second real storage area of the respective first real storage areas is disposed, and which has a relatively low load; associating the migration-targeted second real storage area and the migration-destination first real storage area and storing the migration-targeted second real storage area associated with the migration-destination storage unit; and in a case where the higher-level device has issued a write command corresponding to the migration-targeted second real storage area, reading out data stored in the migration-targeted second real storage area, merging this read-out data with write data related to the write command, and writing this merged data into the second real storage area inside the migration-destination first real storage area.

In a thirteenth aspect according to the twelfth aspect, in a case where a read command with respect to the migration-targeted second real storage area has been issued from the higher-level device, data is read out from the migration-targeted second real storage area and this data is sent to the higher-level device, and notice is sent to the higher-level device to the effect that processing of the read command has been completed, thereafter the data read out from the migration-targeted second real storage area is written to the second real storage area inside the migration-destination first real storage area.

A storage controller according to a fourteenth aspect comprises: a virtual volume that is formed virtually; a plurality of RAID groups comprising either one or a plurality of storage devices; a pool unit for managing a plurality of first real storage areas, which are respectively disposed in a stripe shape in each RAID group, and which have a plurality of second real storage areas respectively; a controller, which, in a case where a write command related to the virtual volume has been issued from a higher-level device, selects a prescribed second real storage area from among the respective second real storage areas included in a prescribed first real storage area of the respective first real storage areas, and associates this prescribed second real storage area with a prescribed area inside the virtual volume corresponding to the write command, and which associates one virtual volume with one first real storage area; a migration-destination determination unit, which selects a migration-targeted first real storage area from among the respective first real storage areas associated with the virtual volume, and selects a migration-destination RAID group that is to be the migration destination of the data stored in this migration-targeted first real storage area from among other RAID groups other than the RAID group in which the migration-targeted first real storage area is disposed; a migration-destination storage unit, which associates the migration-targeted first real storage area with the migration-destination RAID group and stores the migration-targeted first real storage area associated with the migration-destination RAID group; and a command processor, which, in a case where the higher-level device has issued a command corresponding to the migration-targeted first real storage area, migrates, during command processing, data stored in the migration-targeted first real storage area to the migration-destination RAID group stored by the migration-destination storage unit.

Advantageous Effects of Invention

At least one part of the configuration of the present invention is able to be configured as a computer program. This computer program is able to be affixed on a recording medium and distributed, and is able to be delivered by way of a communication network. Furthermore, other combinations besides the combinations of the above-mentioned aspects also fall within the scope of the present invention.

BRIEF DESCRIPTION OF DRAWINGS

FIGS. 30 (30(a) and 30(b)) is a diagram showing one effect of the present invention.

FIG. 31 is a flowchart showing a process for determining a migration destination related to a second embodiment.

FIG. 32 is a flowchart showing a process for freeing a page that stores only 0-data.

DESCRIPTION OF EMBODIMENTS

Figure 1:
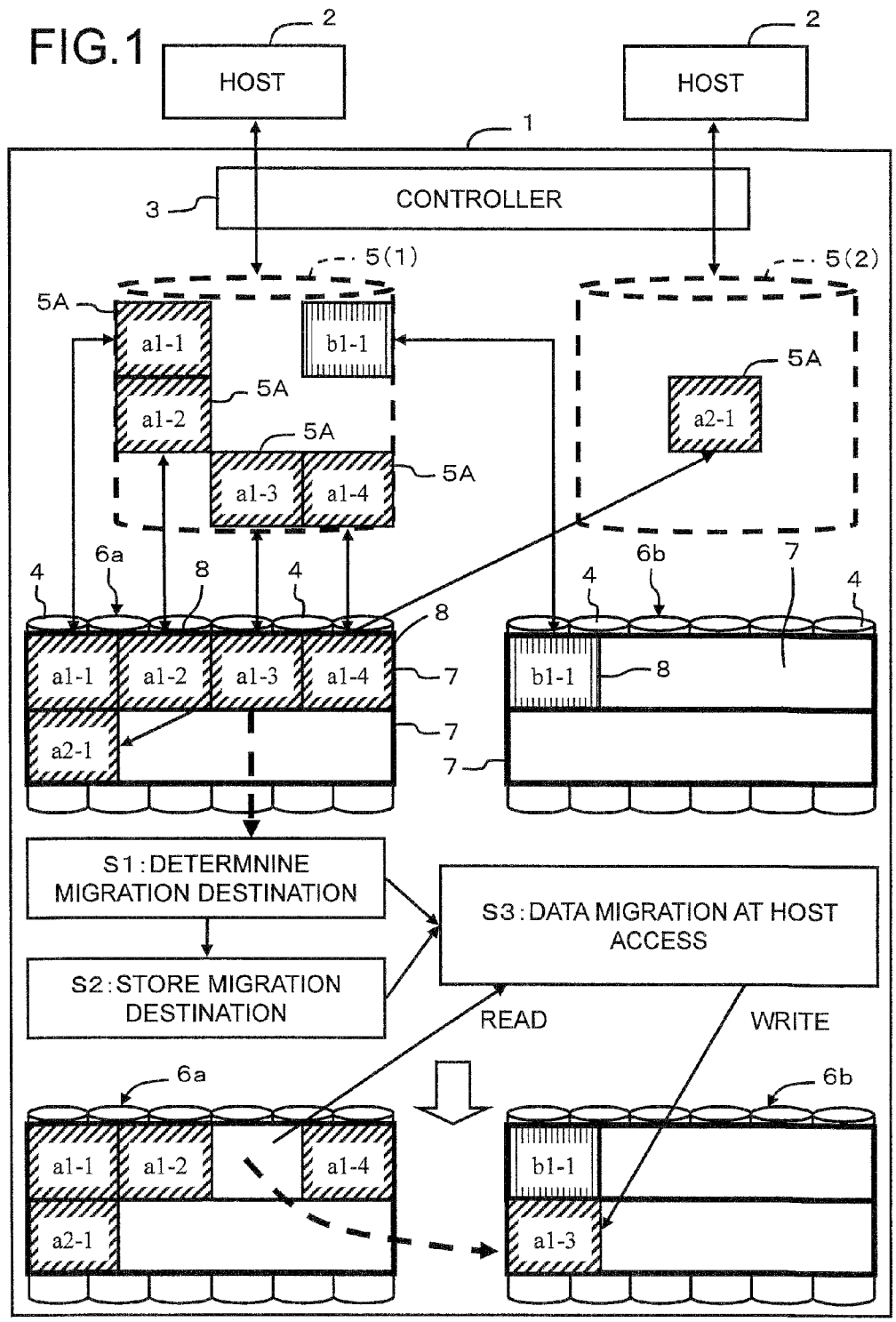
FIG. 1 is a schematic diagram showing the overall concept of an embodiment of the present invention.

The embodiments of the present invention will be explained below based on the drawings. First, an overview of the present invention will be explained, and next the embodiments will be explained. The present invention, as will be described below, allocates a real storage area to a virtual volume 5 as chunk 7 units. The chunk 7 is configured from a plurality of pages 8. One virtual volume 5 is associated with one chunk 7. That is, a single chunk 7 is not associated with a plurality of virtual volumes 5. This makes it possible to efficiently utilize the storage area of the chunk 7.

When creating a virtual volume 5, the respective virtual storage areas 5A and the initialization page 8 are associated beforehand. When a write request is issued to the virtual volume 5 from a host 2, the pages 8 inside the chunk 7 are used in order, and allocated to the virtual storage area 5A involved in the write request. Write data is written to these allocated pages 8. At the time of the data write, the connection destination of the virtual storage area 5A related to the write request is switched from the initialization page 8 to a prescribed page 8 inside the chunk 7. The prescribed page 8 is the page that sequentially follows the page used during the previous write process. That is, at the time the write data is written, the present invention simply switches the page that is allocated to the virtual storage area 5A from the initialization page 8 to the prescribed page 8, thereby making it possible to enhance the response performance of the virtual volume 5.

Furthermore, in a case where the free pages 8 inside the chunk 7 run out, a new chunk 7 is selected and allocated to the virtual volume 5. The new chunk 7 is selected from a group of chunks inside another RAID group 6b. In accordance with this, it is possible to distribute the load among respective RAID groups 6a, 6b.

Furthermore, in the present invention, the migration-targeted page 8 or chunk 7 is selected and the migration destination thereof is determined based on the load and so forth. Then, in a case where the host 2 accesses the migration-targeted page 8 or chunk 7, data is migrated while processing the command (either a write command or a read command) issued from the host 2.

FIG. 1 is a schematic diagram showing an overview of an embodiment of the present invention. The following description related to FIG. 1 presents an overview of the present invention to the extent required to understand and implement the present invention, and the scope of the present invention is not limited to the configuration shown in FIG. 1.

The system shown in FIG. 1, for example, comprises a storage controller 1, and a host 2 as the "higher-level device". The host 2, for example, is configured as a computer, such as a server computer or a mainframe computer. In a case where the host 2 is a host computer, for example, data communication is carried out in accordance with a communication protocol such as FICON (Fiber Connection: a registered trademark), ESCON (Enterprise Systems Connection: a registered trademark), ACONARC (Advanced Connection Architecture: a registered trademark), or FIBARC (Fibre Connection Architecture: a registered trademark). In a case where the host 2 is a server computer or the like, for example, data communication is carried out in accordance with a communication protocol such as FCP (Fibre Channel Protocol) or iSCSI (internet Small Computer System Interface).

The storage controller 1 is connected to the host 2 via a communication network. The storage controller 1, for example, comprises a controller 3, storage devices 4, and virtual volumes 5(1), 5(2). In a case where it is not particularly necessary to make a distinction, a virtual volume will be called virtual volume 5. Respective RAID groups 6a, 6b are each configured from a plurality of storage devices 4. In a case where no particular distinction is made, a RAID group will be called RAID group 6.

As the storage devices 4, for example, it is possible to use a variety of devices that are able to read and write data, such as a hard disk device, a semiconductor memory device, an optical disk device, a magneto-optical disk device, a magnetic tape device, and a flexible disk device.

In a case where a hard disk device is used as each storage device 4, for example, it is possible to use a FC (Fibre Channel) disk, a SCSI (Small Computer System Interface) disk, a SATA disk, an ATA (AT Attachment) disk, or a SAS (Serial Attached SCSI) disk. Or, for example, it is also possible to use a variety of storage devices 4, such as a flash memory, a FeRAM (Ferroelectric Random Access Memory), a MRAM (Magnetoresistive Random Access Memory), an Ovonic Unified Memory, and a RRAM (Resistance RAM). Furthermore, for example, the configuration may also be such that different types of storage devices 4, such as a flash memory device and a hard disk device, are intermixed.

The physical storage areas of the respective RAID groups 6a, 6b are partitioned into a plurality of stripe-shaped chunks 7. Each chunk 7 is configured from a plurality of successive pages 8. The chunk 7 corresponds to the "first real storage area" and the page 8 corresponds to the "second real storage area". For ease of understanding, the reference sign "a1" is provided to a first chunk 7 belonging to the one RAID group 6a, and a serial number is added to each page belonging to the first chunk 7 (a1). The same holds true for the other RAID group 6*b*. Therefore, for example, "a2-3" signifies the third page inside the second chunk of the RAID group 6*a*, and "b1-1" signifies the first page inside the first chunk of the RAID group 6*b*.

The virtual volume 5 is configured from a plurality of virtual storage areas 5A. The virtual storage area 5A and the page 8 are the same size. In one example, the size of one page 8 is SZ1 bytes (for example 32 MB), the size of one chunk 7 is SZ2 bytes (for example, 1 GB), and the size of the virtual volume 5 is SZ3 bytes (for example, 10 GB). In accordance with this, one virtual volume 5 is configured from N1 (for example, 10) chunks 7, and one chunk 7 is configured from N2 (for example, 32) pages 8. The numerical values in brackets above are merely examples for ease of understanding, and the scope of the present invention is not limited to the above numerical values. The above-mentioned page size, chunk size and virtual volume size are able to be set variably.

The controller 3 controls the operation of the storage controller 1. For example, the controller 3 creates the RAID groups 6*a*, 6*b* and virtual volume 5 based on an instruction from the user. Further, the controller 3 executes a process in accordance with a command (read command, write command) issued from the host 2, and sends the result of this processing to the host 2.

Furthermore, in a case where a write command has been received, the controller 3 determines whether or not a page 8 has been allocated to the virtual storage area 5A specified by the write command. In a case where a page 8 has not been allocated to the specified virtual storage area 5A, the controller 3 allocates a prescribed page 8 inside the chunk 7 to the specified virtual storage area 5A. The controller 3 writes the write data to the allocated prescribed page 8.

The controller 3 controls page allocation so that only one virtual volume 5 is associated with one chunk 7. The respective pages 8 included in a single chunk 7 are only allocated to one virtual volume 5. The pages 8 allocated to a plurality of different virtual volumes 5 are not intermixed inside a single chunk 7. Successive pages 8 inside a single chunk 7 are used without regard to the values of the logical addresses.

The one virtual volume 5(1) will be given as an example and explained. The start page 8 (a1-1) inside the chunk 7 (a1) is used for an initial write command, the next page 8 (a1-2) following this start page 8 (a1-1) is used for the next write command, and the next page 8 (a1-3) is used for the write command after that. Then, in a case where an additional write command is received after the last page 8 (a1-4) has been used, a new chunk 7 (b1) is allocated to the virtual volume 5(1).

The start page 8 (a2-1) inside the second chunk 7 of the RAID group 6*a* is allocated to the other virtual volume 5(2). In a case where a new write command targeted at the virtual volume 5(2) is issued, the next page 8 is allocated to the virtual volume 5(2). The reference sign "a2-2" will be added to this page 8, but it has been omitted in FIG. 1.

In this way, the virtual volume 5 is provided to the host 2 in a state in which a real storage area (page 7, chunk 8) that is smaller than the size of the volume as it appears to the host 2 has been allocated to this virtual volume. Then, the required amount of real storage area is dynamically allocated in accordance with the write command from the host 2.

The controller 3 also migrates data between the respective RAID groups 6*a*, 6*b* as described above. The controller 3, for example, selects the migration-targeted data based on the data access frequency (load) and so forth. The controller 3 selects a low-load RAID group 6 as the migration destination to which the migration-targeted data will be migrated. Or, the controller 3 is also able to select a chunk inside the low-load RAID group as the migration destination.

As described above, the controller 3 determines the migration-targeted data and the migration destination thereof (S1), and stores same (S2). In a case where the host 2 will access the migration-targeted data, the controller 3 reads out the migration-targeted data and carries out the command processing, and also migrates this migration-targeted data to the migration-destination storage area (S3).

By configuring this embodiment like this, a real storage area (physical storage area) is allocated to the virtual volume 5 in units of chunks 7 having pluralities of pages 8, and, in addition, a single chunk 7 is allocated to only one virtual volume 5. Therefore, as will be explained below, the storage area inside the chunk 7 is able to be used effectively. The virtual volume 5 is able to be managed the same as a normal logical volume, making it possible to simplify the control structure.

In this embodiment, to uniformly use a plurality of RAID groups 6*a*, 6*b*, the respective chunks 7 (a1), 7 (b1) are selected from the respective RAID groups 6*a*, 6*b* and allocated to the virtual volume 5(1). Consequently, it is possible to level the load of the respective RAID groups 6*a*, 6*b*.

In this embodiment, for example, a data migration plan for distributing the load among the RAID groups 6*a*, 6*b* is created beforehand, and in a case where the host 2 accesses the migration-targeted data, the migration-targeted data is migrated to the migration destination set beforehand while executing the host 2-requested process. Therefore, it is possible to carry out a data migration triggered by an access from the host 2 during normal command processing. In the case of a read process, the task of writing the read-out data to the migration destination is generated, but this has little affect on the response performance of the storage controller since the migration destination is selected from among low-load storage areas.

Furthermore, in this embodiment, although a storage-destination migration is scheduled, data not accessed by the host 2 is not migrated since a migration trigger is not generated for this data. Therefore, it is possible to reduce accesses to the real storage area, and to efficiently migrate only the data that will be used by the host 2.

Furthermore, in this embodiment, since a host 2 access triggers a migration, the timing at which the migration destination is determined results in a time delay between the determination timing and the timing of the actual migration. However, because data that is frequently accessed by the host 2 is quickly migrated to a low-load storage area, there is little affect from the timing discrepancy. This embodiment will be explained in detail below.

Example 1

Figure 2:
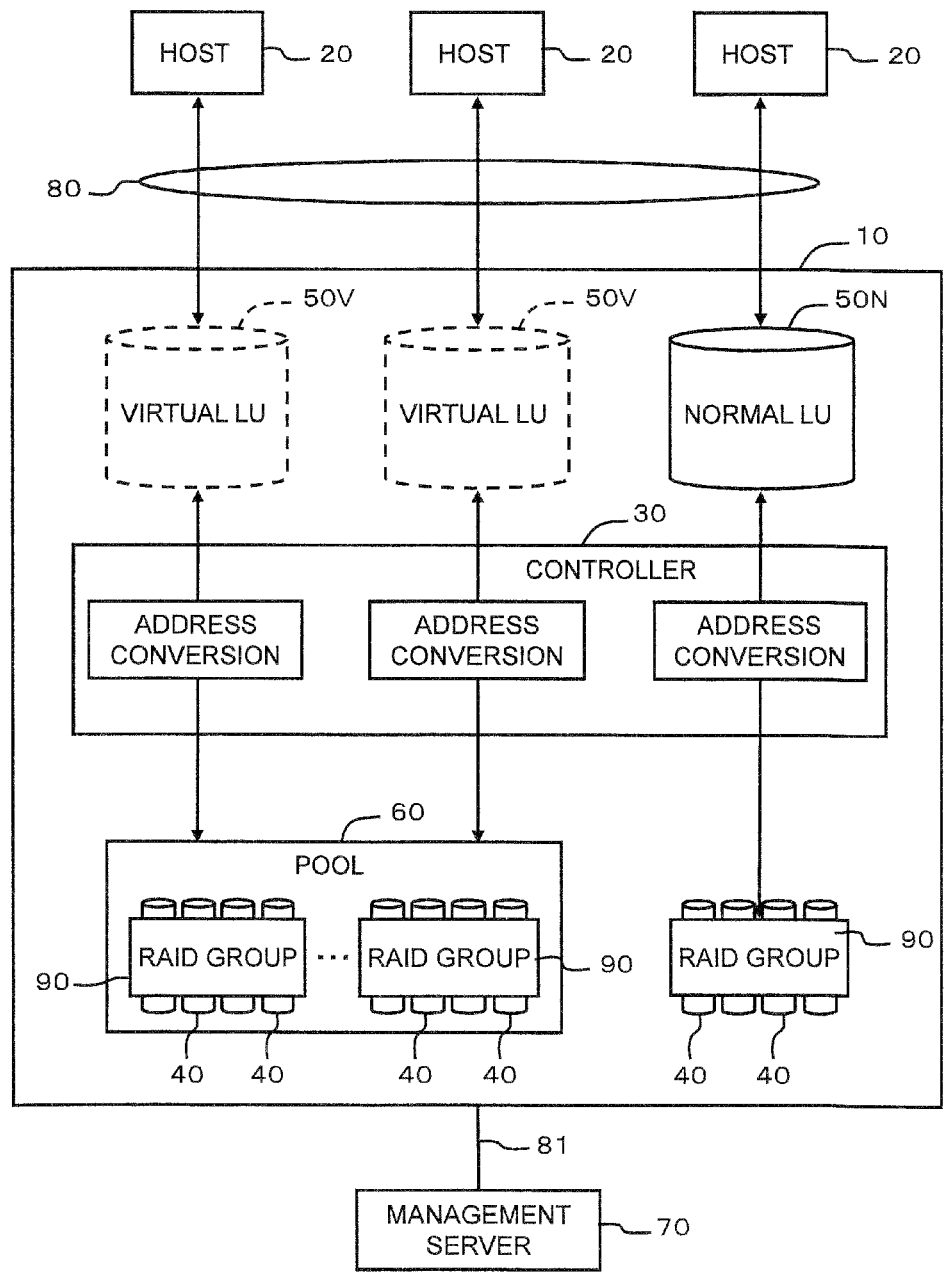
FIG. 2 is a schematic diagram showing the overall configuration of a system comprising a storage controller.

FIG. 2 is a schematic diagram showing the overall configuration of an information processing system comprising a storage controller 10 related to this embodiment. This information processing system, for example, is able to comprise at least one storage controller 10, either one or a plurality of hosts 20, and at least one management server 70.

The corresponding relationship with the embodiment described above in FIG. 1 will be explained. The storage controller 10 corresponds to the storage controller 1, the host 20 corresponds to the host 2, the controller 30 corresponds to the controller 3, the storage devices 40 corresponds to the storage devices 4, the virtual volume 50V (designating two virtual volumes) corresponds to the virtual volume 5, and the RAID groups 90 correspond to the RAID groups 6*a*, 6*b*. As much as possible, explanations that duplicate the explanation given for FIG. 1 will be omitted.

The host 20 and the storage controller 10 are connected via a first communication network 80. The first communication network 80, for example, is configured like a FC-SAN (Fibre Channel-Storage Area Network) or a IP-SAN (Internet Protocol-SAN).

The management server 70 is a device for changing the settings of the storage controller 10 among other things. The management server 70, for example, is connected to the storage controller 10 by way of a second communication network 81 such as a LAN (Local Area Network). Furthermore, it is also possible for this management server to be configured so as to provide the host 20 with a storage management function, and to change the settings of the storage controller 10 from the host 20 side.

The storage controller 10 will be described in detail below, but the storage controller 10 comprises a virtual volume 50V and a normal volume 50N. Furthermore, in the drawing, the logical volume is expressed as "LU". LU is the abbreviated for Logical Unit.

The virtual volume 50V, as described using FIG. 1, is a virtually created logical volume, and is a volume to which a storage area is allocated in accordance with a write command from the host 20. That is, the size of the virtual volume 50V that is provided to the host 20 does not coincide with the size of the actual storage area. The normal volume 50N is a volume created on the basis of the storage area of a RAID group 90.

The pool unit 60 manages the storage areas of a plurality of RAID groups 90. The storage areas managed by the pool unit 60 are allocated to the virtual volume 50V in chunk 91 (refer to FIG. 5) units.

The controller 30 either converts the logical addresses of the respective volumes 50V, 50N to the physical addresses of the RAID groups 90 and writes data to the storage devices 40, or converts the physical address of data read out from the storage devices 40 to a logical address, and sends the data to the host 20.

Furthermore, as described below, the controller 30 creates a data migration plan, and uses an access from the host 20 as a trigger to execute the data migration plan.

Figure 3:
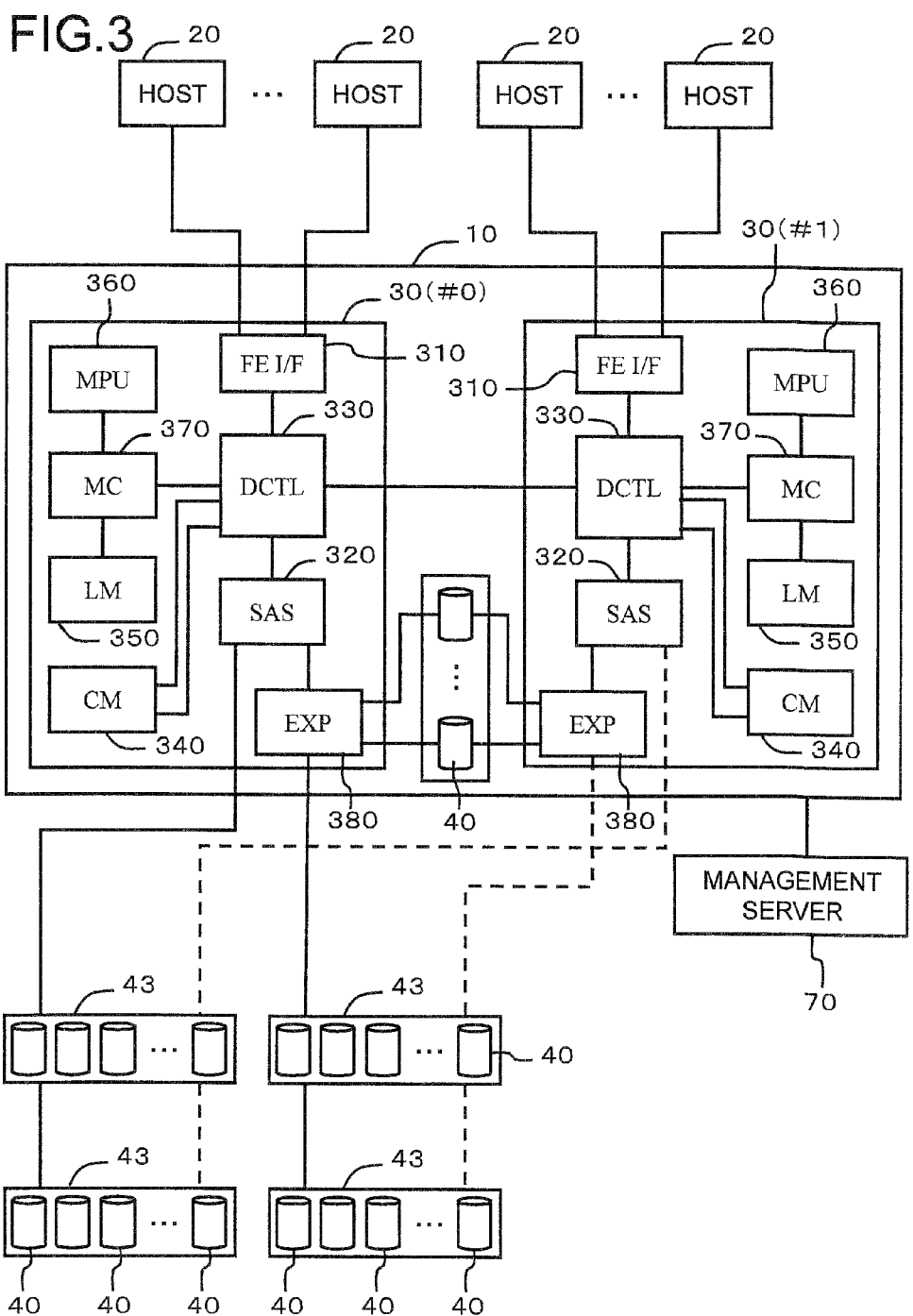
FIG. 3 is a block diagram of the controller.

FIG. 3 is a block diagram showing the configuration of the controller 30. It is possible to connect a plurality of augmentation enclosures 43 to the storage controller 10. An augmentation enclosure 43 houses a plurality of storage devices 40. The user is able to increase the total storage capacity of the system by connecting an augmentation enclosure 43 as needed.

The storage controller 10 comprises a plurality of controllers 30 (#0), 30 (#1). Even in a case where either one of the controllers 30 shuts down due to a failure, it is possible for this storage controller to continue operating in accordance with the other controller 30. In a case where there is no particular need to make a distinction, a controller will be called the controller 30.

The controller 30, for example, comprises a first communication circuit 310 (FE I/F in the drawing), a second communication circuit 320 (SAS in the drawing), a data transmission control circuit 330 (DCTL in the drawing), a cache memory 340 (CM in the drawing), a local memory 350 (LM in the drawing), a microprocessor 360 (MPU in the drawing), a memory controller 370 (MC in the drawing), and an expander 380 (EXP in the drawing).

The first communication circuit 310 is a control circuit for carrying out communications with the host 20. The second communication circuit 320 is a control circuit for carrying out communications with the respective storage devices 40. The data transmission control circuit 330 is for controlling the flow of data inside the storage controller 10. The respective data transmission control circuits 330 are interconnected. The cache memory 340, for example, stores write data received from the host 20, and data written out from the storage devices 40. Furthermore, there are also cases in which management data for managing either the configuration or the operation of the storage controller 10 is also stored in the cache memory 340.

The local memory 350, for example, stores various types of data used by the microprocessor 360. The microprocessor 360, as described below, controls the operation of the storage controller 10 by reading in and executing a computer program from either the storage devices 40 or the local memory 350.

The memory controller 370 is a control circuit for connecting the microprocessor 360 to the local memory 350 and the data transmission control circuit 330. The expander 380 is a circuit for expanding the communication port of the second communication circuit 320. Furthermore, the configuration shown in FIG. 3 is an example, and the present invention is also applicable to a storage controller of another configuration.

Figure 4:
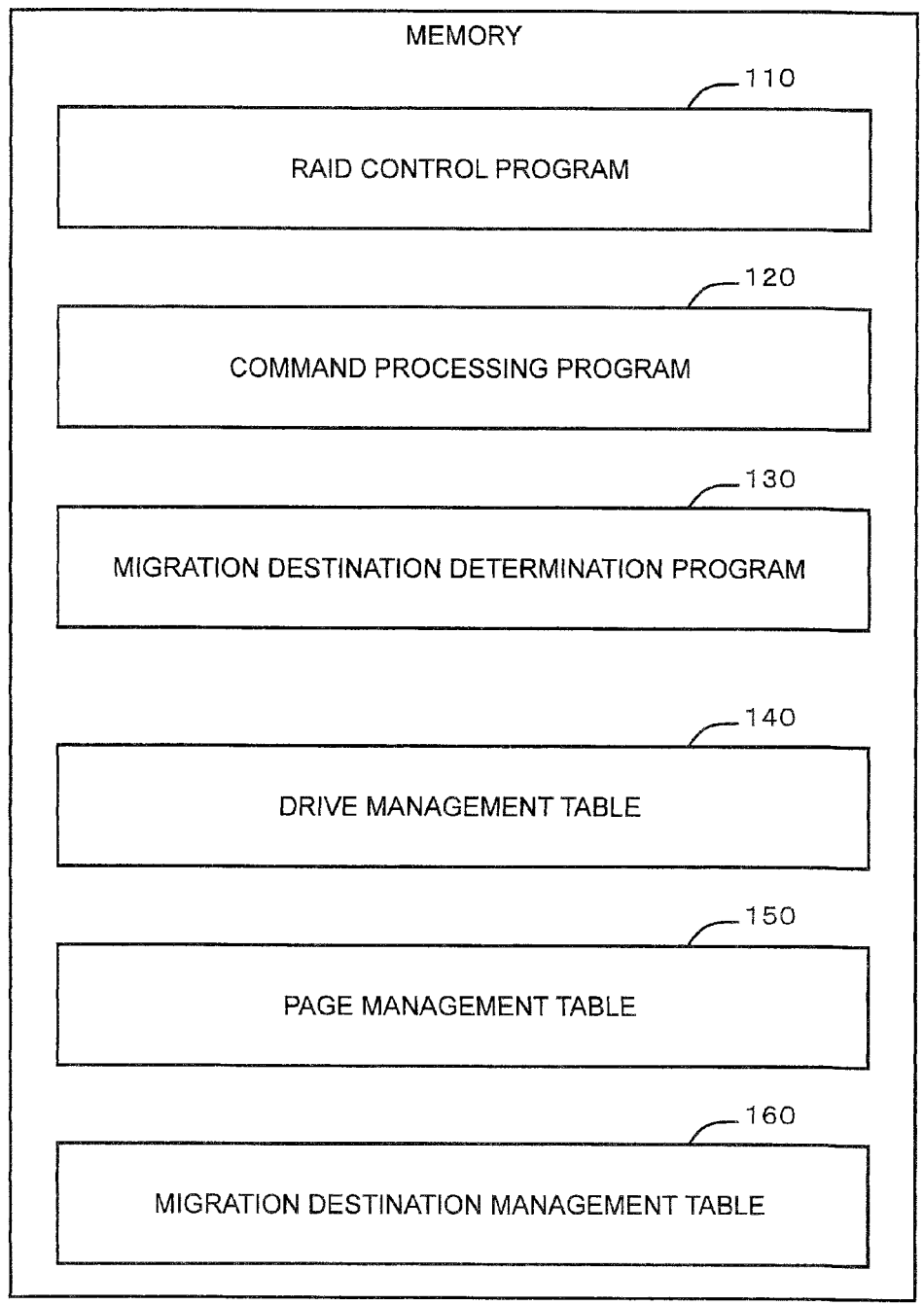
FIG. 4 is a diagram showing programs and tables.

FIG. 4 shows examples of the programs and tables of the storage controller 10. For example, programs 110 through 130 are stored in the memory 360, and tables 140 through 160 are stored in the cache memory 340. The configuration may also be such that the programs and tables are stored inside a specified storage device 40, and are loaded into memory and used as needed.

A RAID control program 110 is for controlling a RAID. The RAID control program 110 uses the drive management table 140 and so forth to manage the RAID configuration.

A command processing program 120 is for processing a command from the host 20. The command may be a write command, a read command, or another command. This other command, for example, may include a command for querying about the creation of a volume, the deletion of a volume, or a volume copy instruction or specification. In cases where the command processing program processes a write command and read command, the command processing program 120 checks whether or not a "data migration destination" has been associated with this processing-targeted data. In a case where the data migration destination has been associated with the processing-targeted data, the command processing program 120 migrates the processing-targeted data to the preset migration destination during command processing.

A migration destination determination program 130 selects, from among the data stored in the virtual volume 50V, data that satisfies a first condition as the migration-targeted data, and migrates this data to a migration destination that satisfies a second condition.

For example, the first condition is the highest load value of a RAID group 90 that exceeds a preset load value. For example, the second condition is the lowest load value of a RAID group 90 that falls below another preset load value.

Another first condition is the largest utilization capacity of a RAID group 90 for which the utilization capacity is larger than the value of a preset utilization capacity. Another second condition is the smallest utilization capacity of a RAID group 90 which falls below another preset utilization capacity value. The utilization capacity may also be expressed as a percentage.

In a case where a host access triggers the migration of data, the load and utilization capacity of the migration-origination RAID group 90 both decrease. The load and utilization capacity of the migration-destination RAID group 90 both increase.

The drive management table 140 is information for managing the respective storage devices 40. The drive management table 140, for example, manages the type and capacity of each storage device 40, and the number of the RAID group to which it belongs.

A page management table 150 manages respective pages 92 and respective chunks 91. The page management table 150 will be explained in detail below using FIGS. 6 through 8.

A migration destination management table 160 manages information related to the migration destination of the migration-targeted data, and manages information that is used for determining the migration destination. The migration destination determination table 160 will be explained in detail below using FIG. 9.

Figure 5:
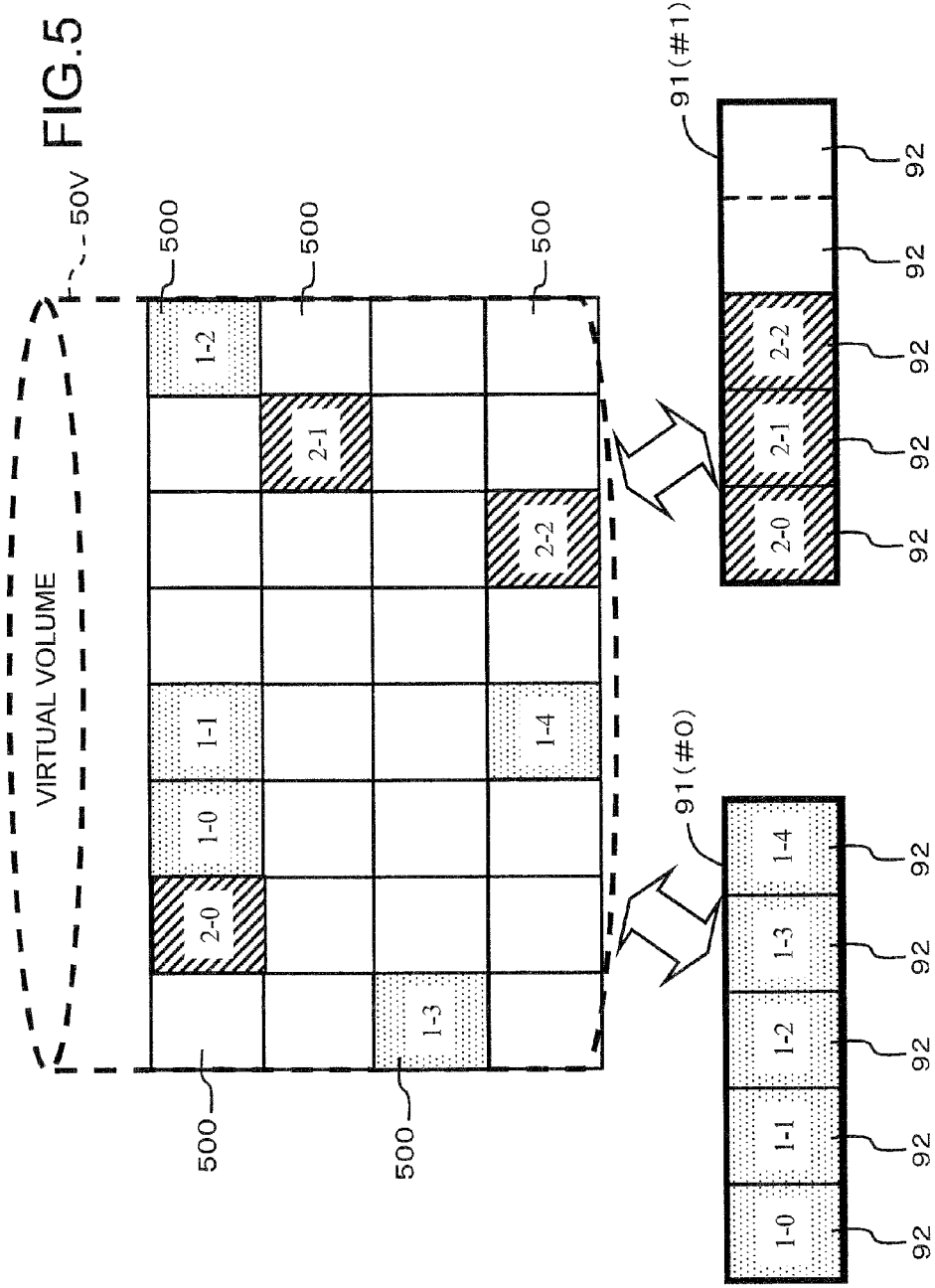
FIG. 5 is a diagram showing a virtual volume and the relationship between a chunk and a page.

FIG. 5 is a schematic diagram showing the relationship between the virtual volume 50V and chunks 91. The virtual volume 50V comprises a plurality of virtual storage areas 500. Each chunk 91 comprises a plurality of pages 92. For the sake of convenience, FIG. 5 shows the respective pages 92 as being formed by partitioning a stripe-shaped chunk 91 in the transverse direction, but actually each page 92 is formed along a stripe.

In FIG. 5, first, it is supposed that a first chunk 91 (#0) has been allocated to the virtual volume 50V. Each time a write command (write request) for the virtual volume 50V is received, the pages 92 inside the first chunk 91 (#0) are selected in order, and associated with the virtual storage area 500 corresponding to the write command. Write data is written to the page 92 associated with the virtual storage area 500. That is, the write data is written to each storage area of each storage device 40 configuring this page 92.

After the initial page 92 (1-0) of the first chunk 91 (#0) has been used, the next page 92 (1-1) is used, and then the next page 92 (1-2) is used. Then, it is supposed that the last page 92 (1-4) of the first chunk 91 (#0) has been used. Consequently, all the pages 92 of the first chunk 91 (#0) have been used.

In a case where a new write command is issued from the host 20, a second chunk 91 (#1) is selected from inside another RAID group 90, and the start page 92 (2-0) of the second chunk 91 (#1) is used. Thereafter, each page 92 inside the second chunk 91 (#1) is used in order the same as described with respect to the first chunk 91 (#0).

In this way, a plurality of chunks 91 (#0), 91 (#1) are associated with the virtual volume 50V. These chunks 91 (#0), 91 (#1) are respectively selected from inside separate RAID groups 90. That is, a plurality of chunks 91, which are selected from inside a plurality of RAID groups 90, are associated with the virtual volume 50V. The pages 92 inside the associated chunks 91 are used in accordance with a data write to the virtual volume 50V by the host 20.

Furthermore, in a case where the host 20 requests the deletion of data from inside the virtual volume 50V, the page 92 corresponding to the logical address of the delete-targeted data is released and returned to an unused page. Different write data is written to the unused page.

The more the host 20 uses the virtual volume 50V, large numbers of pages 92 are steadily allocated to the virtual volume 50V. In accordance with this, the difference between the amount of physical storage area that the virtual volume 50V actually comprises and the capacity the virtual volume 50V is showing to the host 20 diminishes.

A case in which a new RAID group 90 has been added to the pool unit 60 will be considered. Although omitted from the drawing, the number of this new RAID group is #2. In a case where the chunk 91 (#1) has already been used up, a chunk 91 (#2) from the new RAID group 90 (#2) may be selected.

However, having added the new RAID group 90 (#2), it would be a waste not to be able to use the new RAID group 90 (#2) until the existing chunk 91 (#1) has been used up.

Accordingly, in this embodiment, a data migration plan for equalizing the loads and/or the utilization capacities of the respective RAID groups 90 (#0) through 90 (#2) is created, and a host access triggers the migration of data. In accordance with this, it is possible to begin using the RAID group 90 (#2) newly added to the pool unit 60 relatively early.

Figure 6:
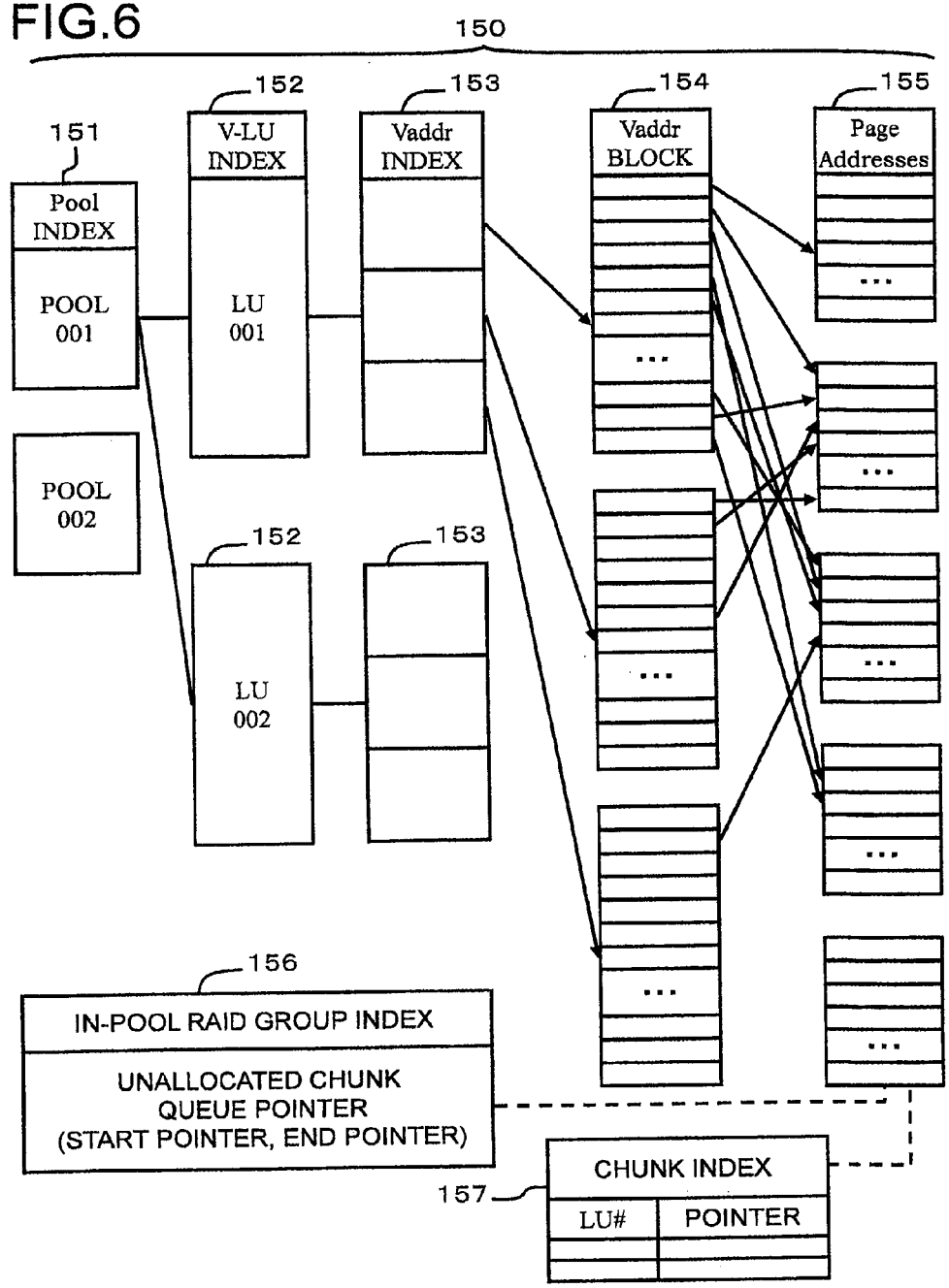
FIG. 6 is a diagram showing a group of tables for managing chunks and pages.

FIG. 6 is a schematic diagram showing the page management table 150 for managing the virtual volume 50V. As shown in FIG. 6, the page management table 150 comprises, for example, a plurality of tables 151 through 155. The page management table 150 is provided on cache memory 340, and thereafter, is stored in a prescribed management area inside a prescribed storage device 40. Further, the page management table 150 is also copied to the local memory 350, and used by the microprocessor 360.

A pool index 151, for example, is information for managing information related to the configuration (including status and attribute) of the pool unit 60, such as the identification number of the RAID group 90 being managed by the pool unit 60.

A virtual volume (V-LU) index 152 is information for managing information related to the configuration of the virtual volume 50V. The virtual volume index 152, for example, manages the identification number of the chunk 91 allocated to the virtual volume 50V, and information of a linked virtual address (Vaddr) index 153.

The virtual address index 153 is information for managing a pointer that points to a virtual address block 154. The virtual address block 154 is information for managing a pointer that points to page address information 155.

For example, in a case where the volume size of the virtual volume 50V is 10 GB, the virtual address index 153 manages the virtual address area of the virtual volume 50V by dividing same into areas of 4 GB each (the first two areas are 4 GB, and the last area is 2 GB). The virtual address blocks 154 are each able to cover a 4 GB range. In this embodiment, the virtual address area of the virtual volume 50V is hierarchically managed by dividing this area into two tiers, i.e., the virtual address index 153 and the virtual address block 154, like this. In accordance with this, it is possible to search by focusing on a range, and to quickly access the relevant page 92. Furthermore, the above-mentioned numerical values (4 GB, 10 GB, 2 GB) are merely examples for explaining the present invention, and the present invention is not limited to these numerical values. The above numerical values may be variably set.

The page address information 155 is information for managing the configuration information of the respective virtual storage areas 500 (that is, the virtual pages 500) configuring the virtual volume 50V. The page address information 155, for example, comprises a physical address, which shows the physical page 92 associated with the virtual page, and a page status.

An in-pool RAID group index 156 is information for managing the configuration information of the respective RAID groups 90 managed by the pool unit 60. The in-pool RAID group index 156, for example, manages the information and so forth of the chunks 91 of the respective RAID groups 90 inside the pool unit 60. Further, the in-pool RAID group index 156 comprises a pointer for respectively pointing at the start and end of an unallocated chunk queue.

A chunk index 157 comprises a pointer for managing how many chunks 91 are allocated to each virtual volume 50V. That is, the chunk index 157 manages the number of chunks that are allocated to each virtual volume 50V.

Figure 7:
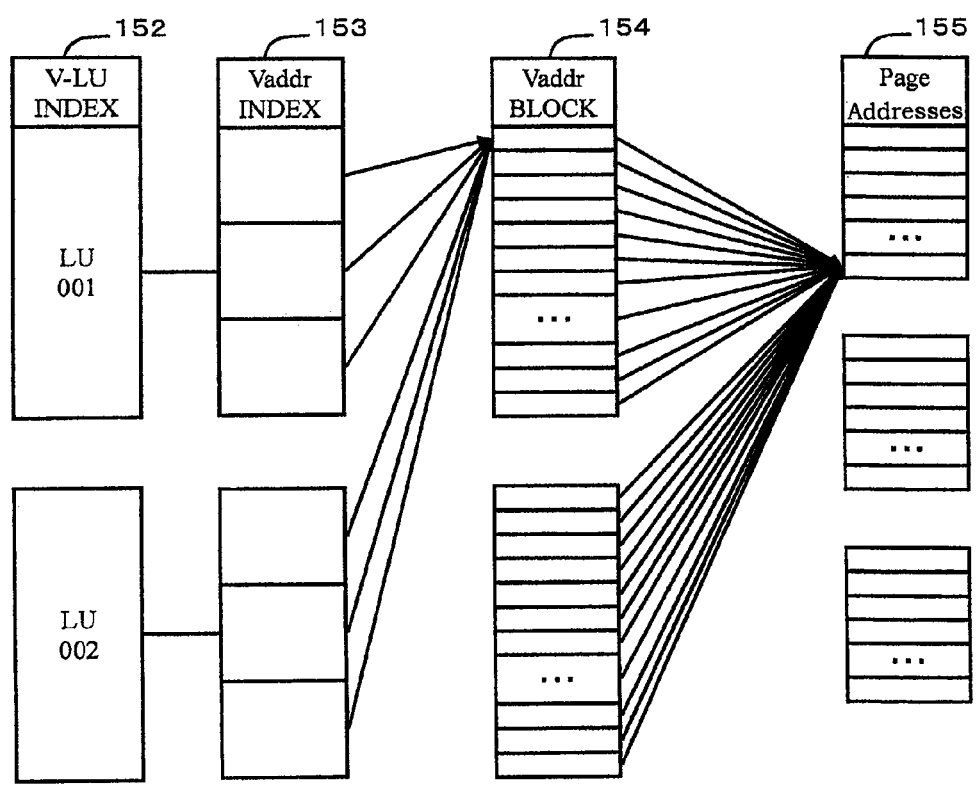
FIG. 7 is a schematic diagram showing how the group of tables is connected when creating a virtual volume.
Figure 8:
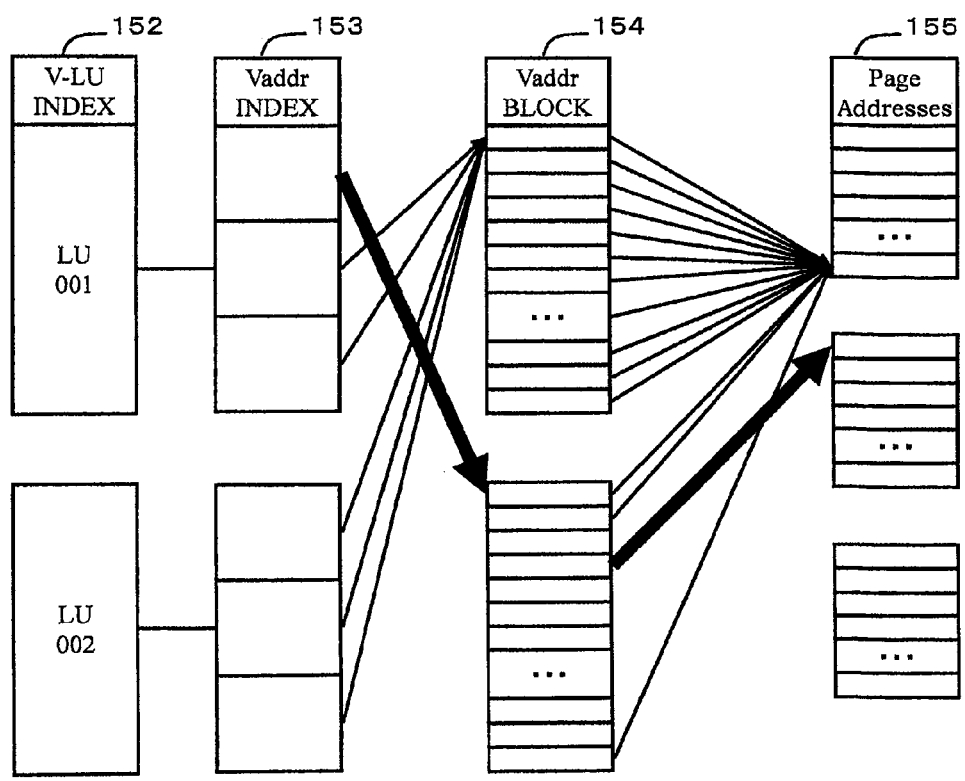
FIG. 8 is a diagram showing how a page allocated to the virtual volume is switched from an initialization page to a prescribed page when writing write data.

FIG. 7 shows a state in which the page management table 150 shown in FIG. 6 has been initialized. The page management table 150 is initialized at virtual volume 50V creation as shown in FIG. 7. The respective virtual storage areas 500 (virtual pages 500) included in the virtual volume 50V are mapped to a specified page 92 inside a specified chunk 91.

For example, as shown in FIG. 7, the last page 92 of the first chunk 91 inside the RAID group 90 is used as the specified page for initialization use. Management information, such as the above-mentioned group of tables, is stored in the first chunk 91. Pages inside the first chunk 91, from the first page 92 up to a prescribed number of pages 92, are used as the management information save area. Although it will differ in accordance with the number of settable virtual volumes, the total size of the management information will be less than the chunk size (for example, 1 GB). Therefore, at a minimum, the management information will not be stored in the last page 92 of the first chunk 91. That is, the last page 92 of the first chunk 91 will not be used as the storage destination for the management information.

Accordingly, only O-data is stored beforehand in the initialization page 92, which is the last page of the first chunk 91. Then, in a case where the page management table 150 is initialized, all of the virtual storage areas 500 inside the virtual volume 50V are associated with the initialization page 92.

In accordance with this, it is possible to check in advance that there are no abnormalities in the mapping of the group of tables when defining the virtual volume 50V (at virtual volume 50V creation). Furthermore, as indicated by the thick lines in FIG. 8, in a case where a write command has been issued to the virtual volume 50V, it is simply a matter of reconnecting the virtual storage area 500 corresponding to the logical address specified in this write command to a prescribed page to which the write data is to be written from the initialization page 92. Therefore, the write data is able to be stored by simply switching the association destination of the virtual storage area 500, making it possible to enhance the response performance of the virtual volume 50V.

Figure 9:
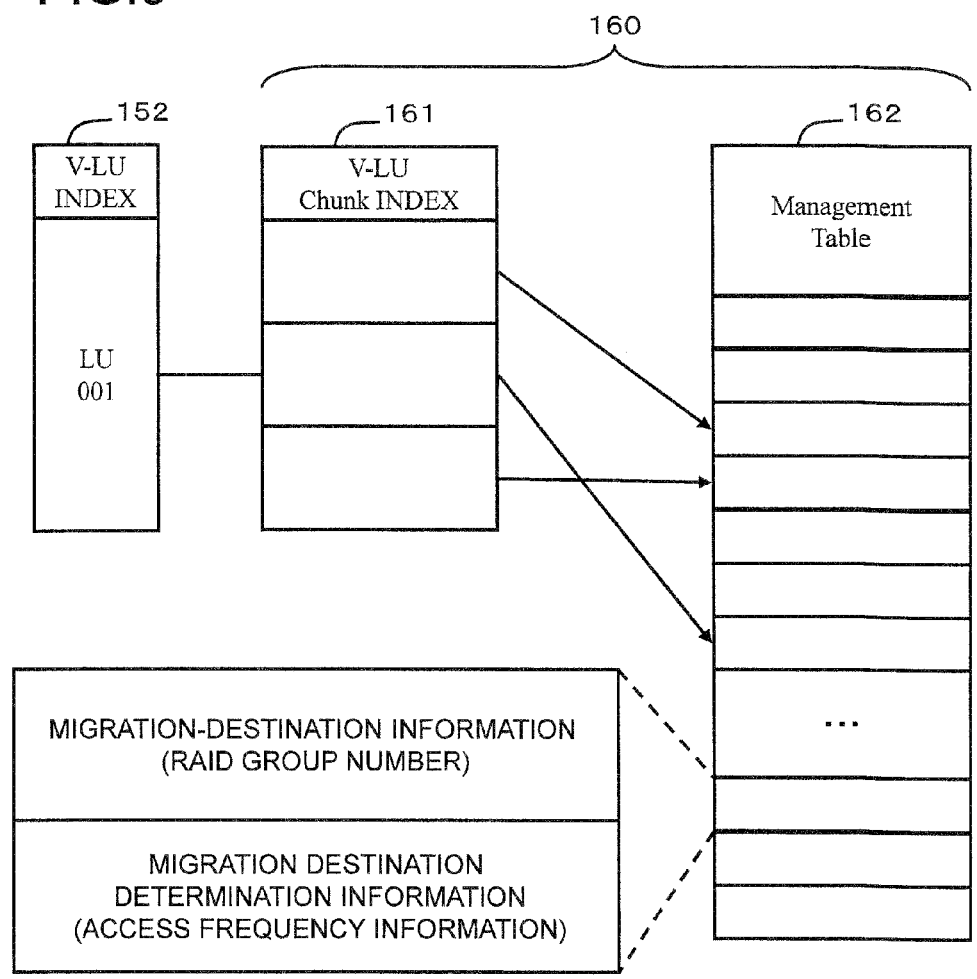
FIG. 9 is a diagram showing a migration destination management table.

FIG. 9 shows an example of the migration destination management table 160. The migration destination management table 160, for example, may also be stored in the cache memory the same as the above-mentioned page management table 150.

The migration destination management table 160, for example, is configured by associating a chunk index 161 with a chunk information management table 162. The chunk information management table 162 stores migration destination information and migration destination determination information as management information for managing each chunk.

The migration destination information is information showing the storage destination for storing the migration-targeted data. For example, the number of the RAID group 90 determined as the migration destination is used as the migration destination information. Furthermore, the migration destination information is not limited to the RAID group number, and a combination of the RAID group number and the chunk number may also be used.

The migration destination determination information is information used for determining the migration destination of the migration-targeted data. The frequency with which this data is accessed, for example, may be used as the migration destination determination information. As will be explained below, it is also possible to use the utilization capacity (utilization rate) of the RAID group 90 as the migration destination determination information.

Furthermore, the load information used for determining the migration destination is not limited to the access frequency, and, for example, the access size (size of the write data) and access pattern (sequential access or random access) may also be used.

The chunk index 161 associates a prescribed entry of the chunk information management table 162 with the virtual volume 50V. The prescribed entry is the entry storing the management information of the chunk 90 associated with the virtual volume 50V shown in the chunk index 161.

Figure 10:
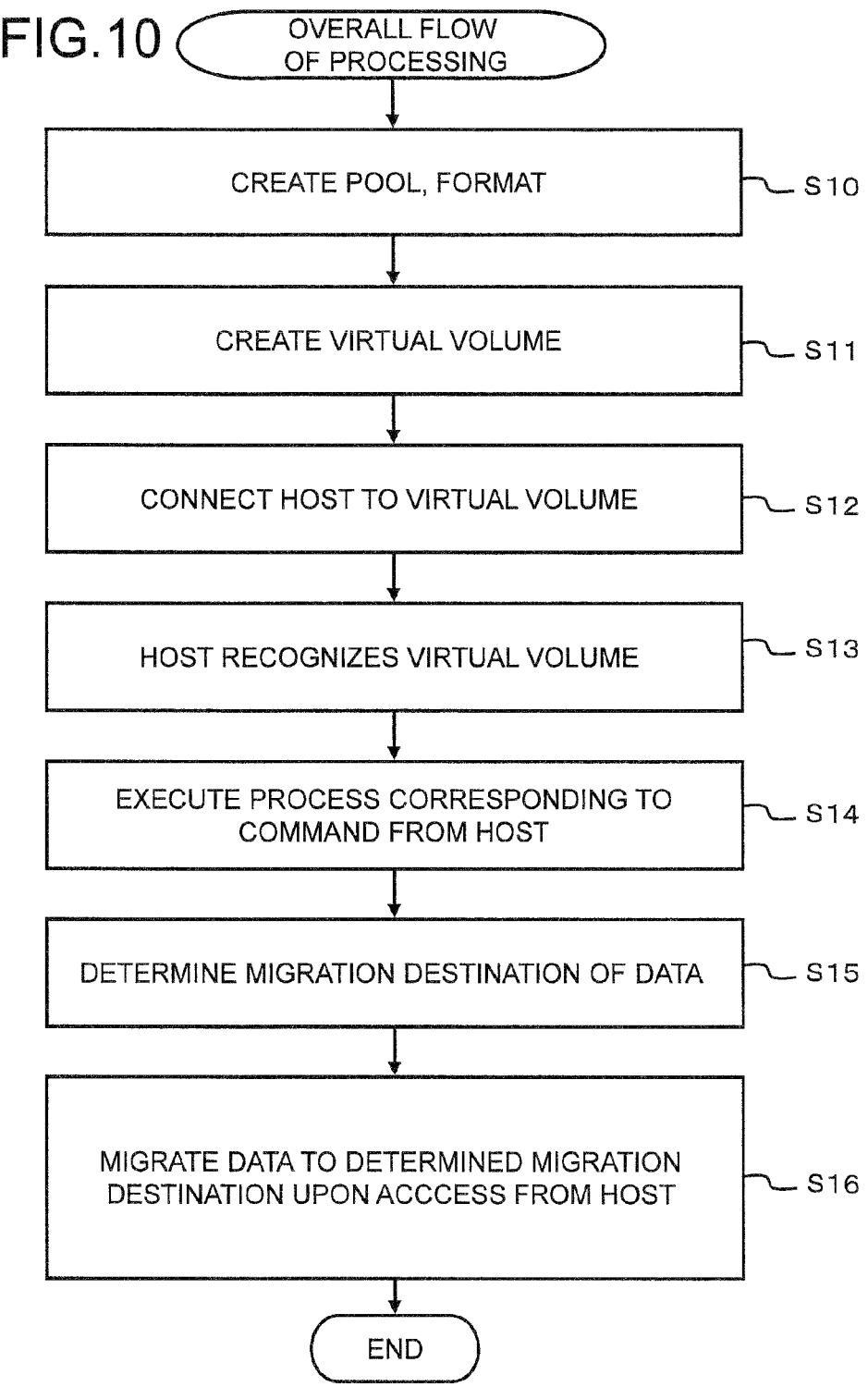
FIG. 10 is a diagram showing the overall flow of operations of the storage controller.

FIG. 10 is a flowchart for understanding the overall operation of the storage controller 10. User procedures are also included in this flowchart. First of all, the user creates a RAID group 90 in the pool unit 60 by giving a prescribed instruction to the storage controller 10 by way of the management server 70, and, in addition, formats this RAID group 90 and creates an unallocated chunk queue (S10). The RAID group 90 for virtual volume 50V use, which is managed inside the pool unit 60, and the RAID group 90 for normal volume 50N use are managed in sequence.

Next, the user creates a virtual volume 50V by giving another prescribed instruction to the storage controller 10 from the management server 70 (S11). As described above, the respective virtual storage areas 500 are respectively associated with the initialization page 92 at virtual volume 50V creation. The virtual volume 50V and the normal volume 50N are managed in sequence at this point. In accordance with this, the virtual volume 50V and the normal volume 50N are able to be managed using a common management method, making it possible to intermix the virtual volume 50V and the normal volume 50N inside the storage controller 10.

Next, the user connects the host 20 to the virtual volume 50V (S12). The user connects the virtual volume 50V to the LUN (Logical Unit Number) linked to the host 20, and also carries out WWN (Logical Unit Number) registration.

The host 20 recognizes the virtual volume 50V (S13), and issues a command, such as a write command, to the virtual volume 50V. The storage controller 10 carries out processing in accordance with the command from the host 20, and sends this result to the host 20 (S14).

The storage controller 10 determines and stores the migration destination for the data inside the respective RAID groups 90 associated with the virtual volume 50V either in accordance with a prescribed time period, or in accordance with a user instruction from the management server 70 (S15).

When the host 20 accesses the data selected at the migration target, the storage controller 10 implements the scheduled data migration while processing the command related to this host access (S16). Each process will be explained in detail below by referring to the drawings.

Figure 11:
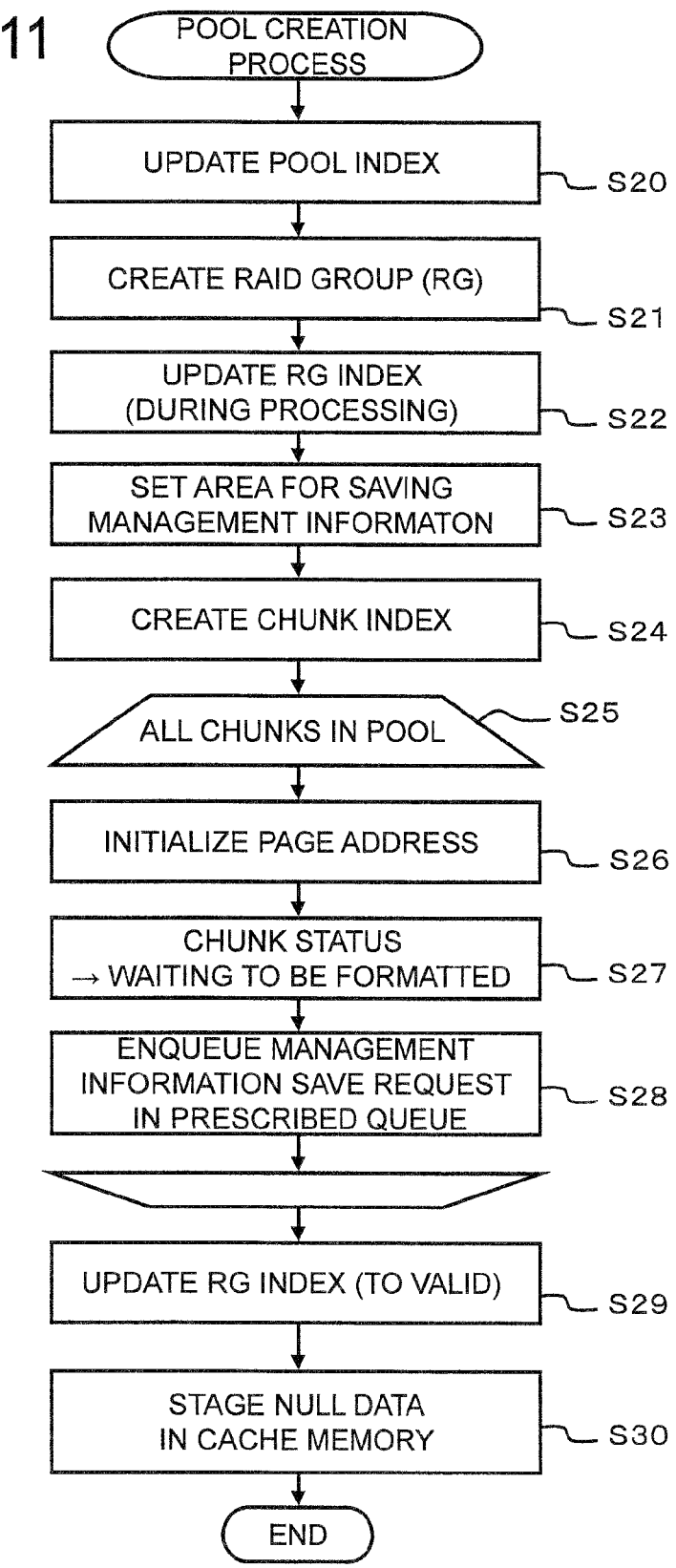
FIG. 11 is a flowchart showing a pool creation process.

FIG. 11 is a flowchart showing a pool creation process. The respective flowcharts described below show overviews of the respective processes. A so-called person with ordinary skill in the art should be able to replace, change or delete the steps shown in the drawing, or add a new step.

The process shown in FIG. 11 is commenced when a pool creation request has been issued. The controller 30 will be the subject of the action below. The controller 30 updates the pool status in the pool index 151 of the creation-targeted pool unit 60 (S20), and creates a RAID group 90 (S21). The controller 30 changes the status of the in-pool RAID group index 156 to "processing" (S22).

The controller 30 sets the area for saving the management information inside the RAID group 90 (S23), and, in addition, creates a chunk index 157 (S24). The following steps S26 through S28 are respectively executed for all the chunks 91 inside the pool unit 60 (S25).

The controller 30 initializes the page address information 155 corresponding to a target chunk (S26), and changes the status of the target chunk to "waiting to be formatted" (S27). The controller 30 enqueues a management information comparison request in the save request queue for saving the management information (S28).

After executing Steps S26 through S28 for each chunk 91, the controller 30 changes the status of the in-pool RAID group index 156 to "Valid" (S29). Then, the controller 30 stages NULL data in the cache memory 340 (S30), and ends this processing. This is because, in a case where a data read from a virtual storage area 500 in which write data is not written is requested, the controller returns NULL data to the host 20 without accessing the page 92, which is the physical storage area.

Figure 12:
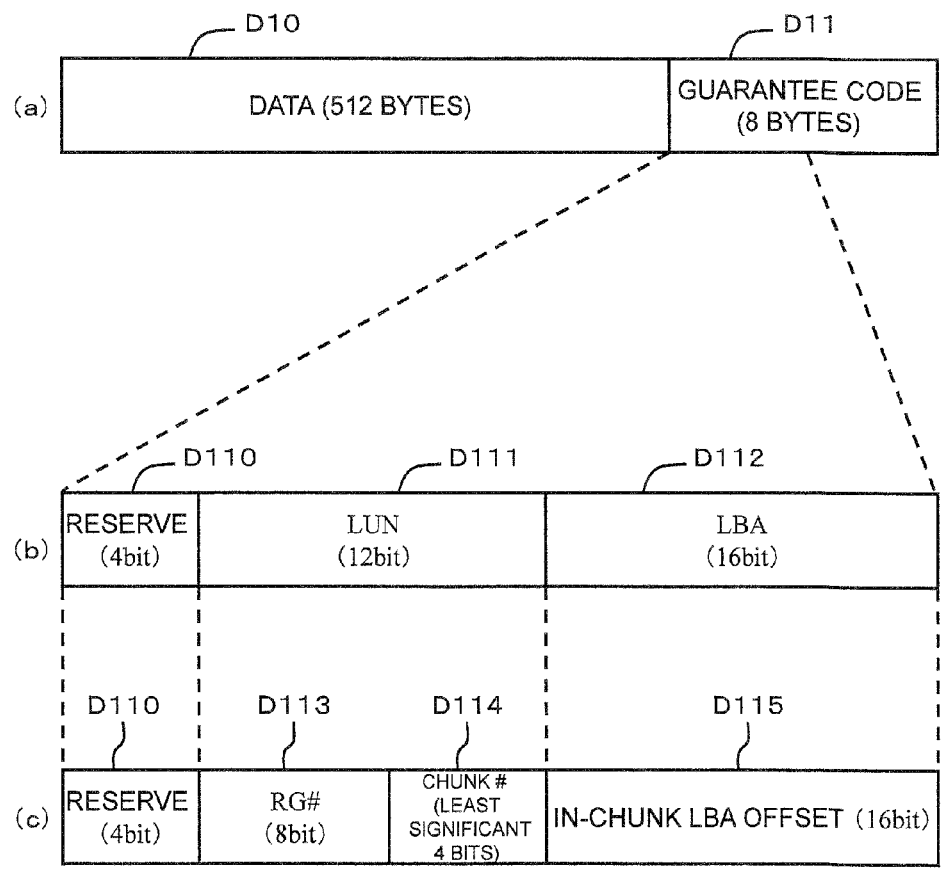
FIGS. 12 (12(a), 12(b), and 12(c)) is a diagram showing the configuration of a guarantee code appended to data.

FIGS. 12 (12(a), 12(b), and 12(c)) is a diagram for illustrating data and a guarantee code. As shown in FIG. 12(a), in this embodiment, for example, an 8-byte guarantee code D11 is appended to each 512-bytes of data D10, and stored in a storage device 40. The guarantee code D11 may comprise a part for verifying a logical address and a part for verifying a bit error. The following explanation will focus on the part for verifying a logical address.

FIG. 12(b) shows the configuration of the guarantee code, which is appended to data stored in the normal volume 50N. The part of the guarantee code related to the normal volume 50N that is used to verify a logical address comprises a 4-bit reserved area D110, a 12-bit LUN area D111, and a 16-bit LBA area D112. LBA is an abbreviation for Logical Block Address. A LUN that is associated with the normal volume 50N is stored in the LUN area D111. The logical address of the data D10 is stored in the LBA area D112.

FIG. 12 (c) shows the configuration of the guarantee code, which is appended to data stored in the virtual volume 50V. The part of the guarantee code related to the virtual volume 50V that is used to verify a logical address comprises a 4-bit reserved area D110, an 8-bit RAID group identification area D113, a 4-bit chunk identification area D114, and a 16-bit in-chunk LBA offset area D115. Information for identifying a RAID group 90 (RAID group #) is stored in the RAID group identification area D113. The least-significant 4 bits of information for identifying a chunk 91 is stored in the chunk identification area D114. An offset value from the first logical address of the chunk 91, in which the data D10 is stored, is stored in the in-chunk LBA offset area D115.

Figure 13:
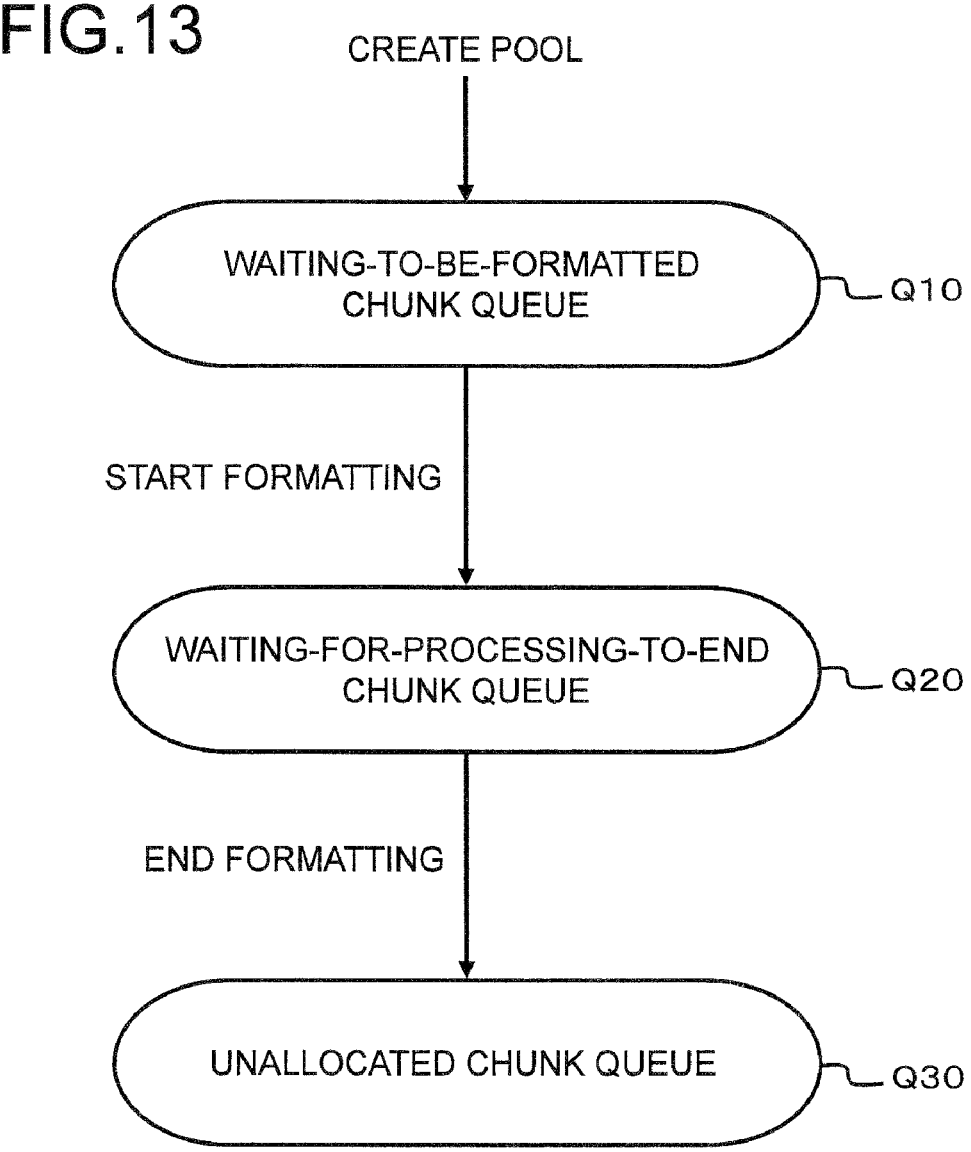
FIG. 13 is a diagram showing the transitional states of a chunk.

A queue for managing the chunks 91 will be explained on the basis of FIGS. 13 and 14. FIG. 13 is a schematic diagram showing a queue utilization method. When the pool unit 60 is created, the respective chunks 91 of the respective RAID groups 90 managed by the pool unit 60 are registered and managed in a waiting-to-be-formatted chunk queue Q10. When formatting starts, the chunk 91 being formatted is moved to a waiting-for-processing-to-end chunk queue Q20. Then, when formatting is complete, the formatted chunk 91 is moved to an unallocated chunk queue Q30.

Figure 14:
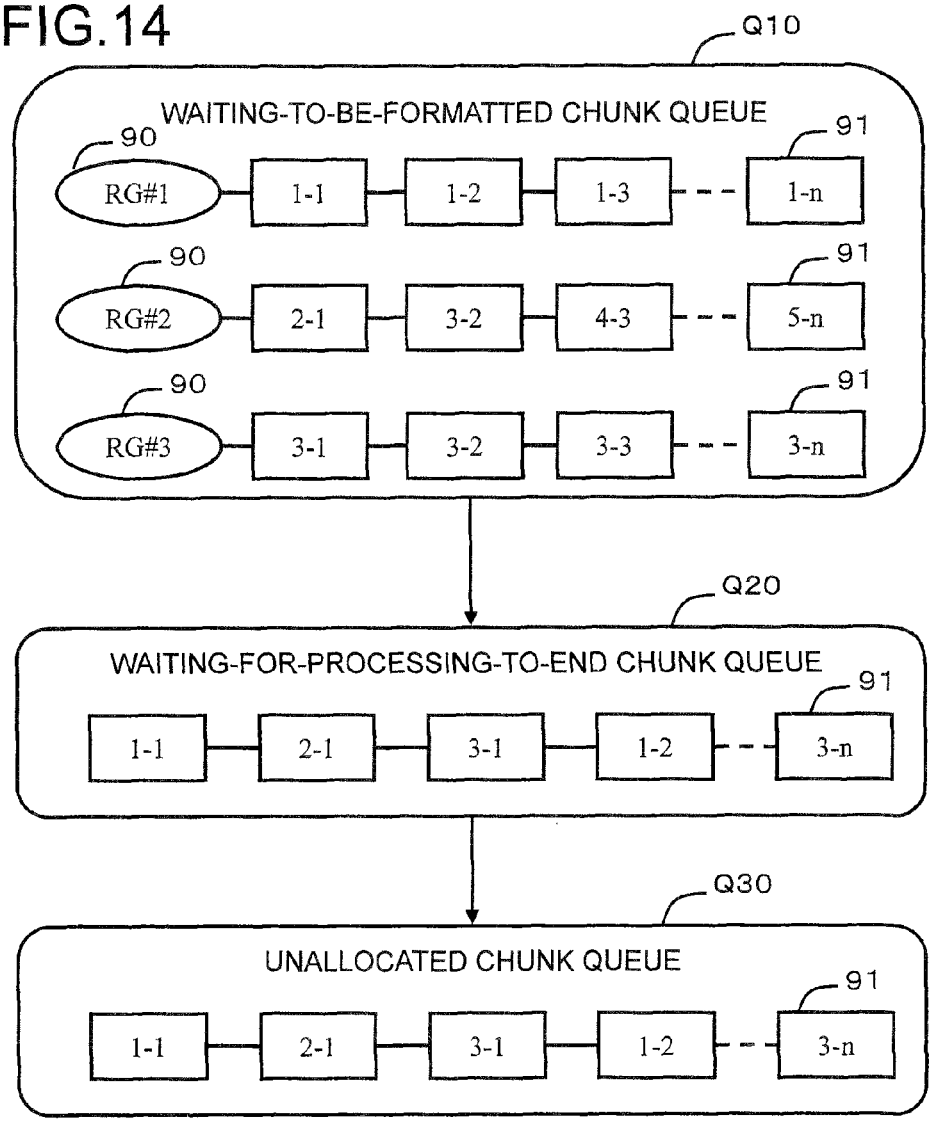
FIG. 14 is a diagram showing queues for managing chunks.

FIG. 14 is a diagram schematically showing the respective queues Q10, Q20, Q30. The waiting-to-be-formatted chunk queue Q10 is prepared for each RAID group 90. Then, when the formatting process begins, the chunks 91 are fetched in a prescribed order from each RAID group 90 inside the waiting-to-be-formatted chunk queue Q10, and connected to the waiting-for-processing-to-end chunk queue Q20. A chunk 91, for which formatting has been completed, as mentioned above, is connected to the unallocated chunk queue Q30. Since formatting is completed in the order in which the chunks are connected to the waiting-for-processing-to-end chunk queue Q20, the order of the respective chunks 91 inside the waiting-for-processing-to-end chunk queue Q20 normally coincides with the order of the respective chunks 91 inside the unallocated chunk queue Q30.

Figure 15:
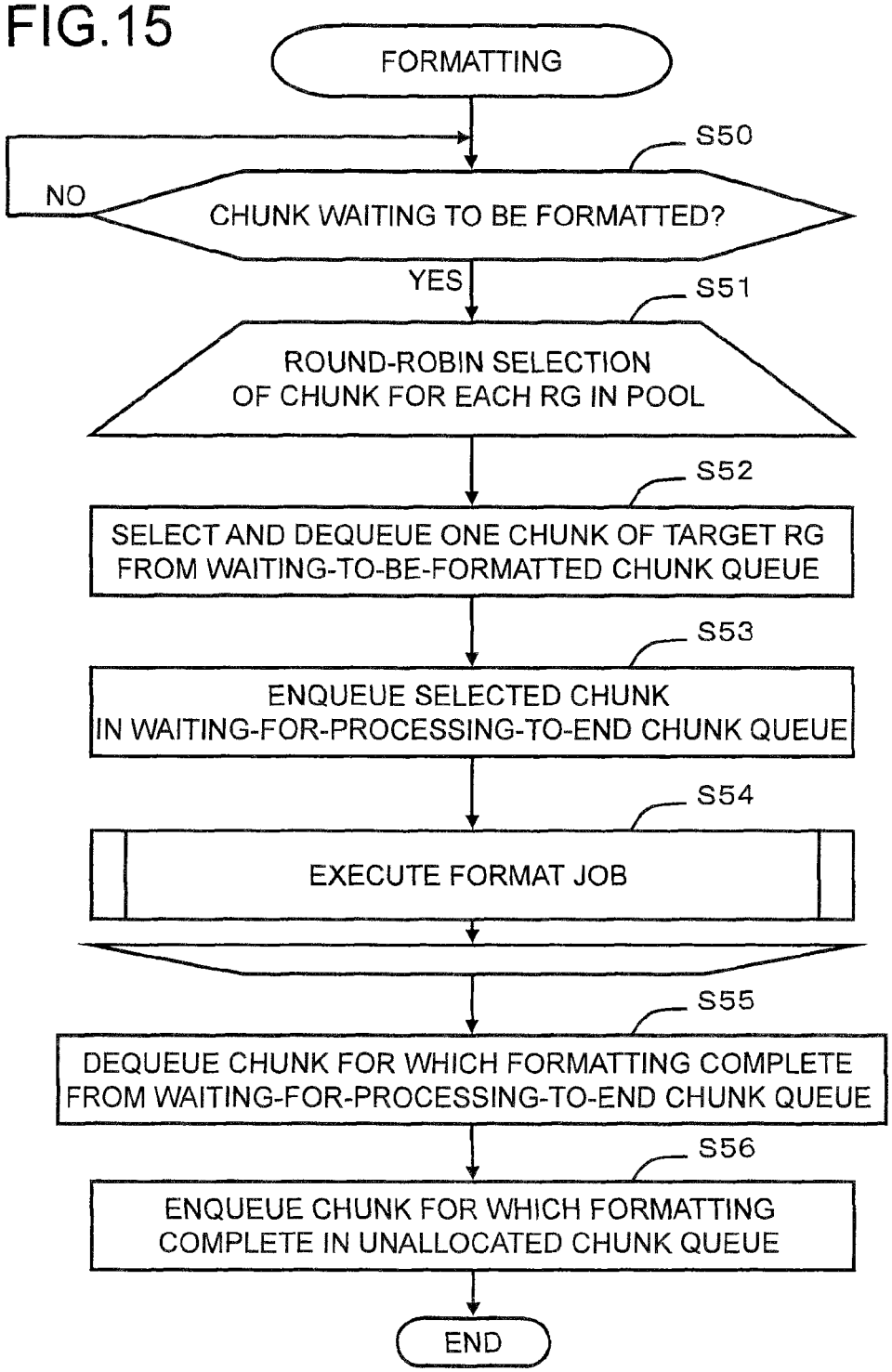
FIG. 15 is a flowchart showing a formatting process.
Figure 16:
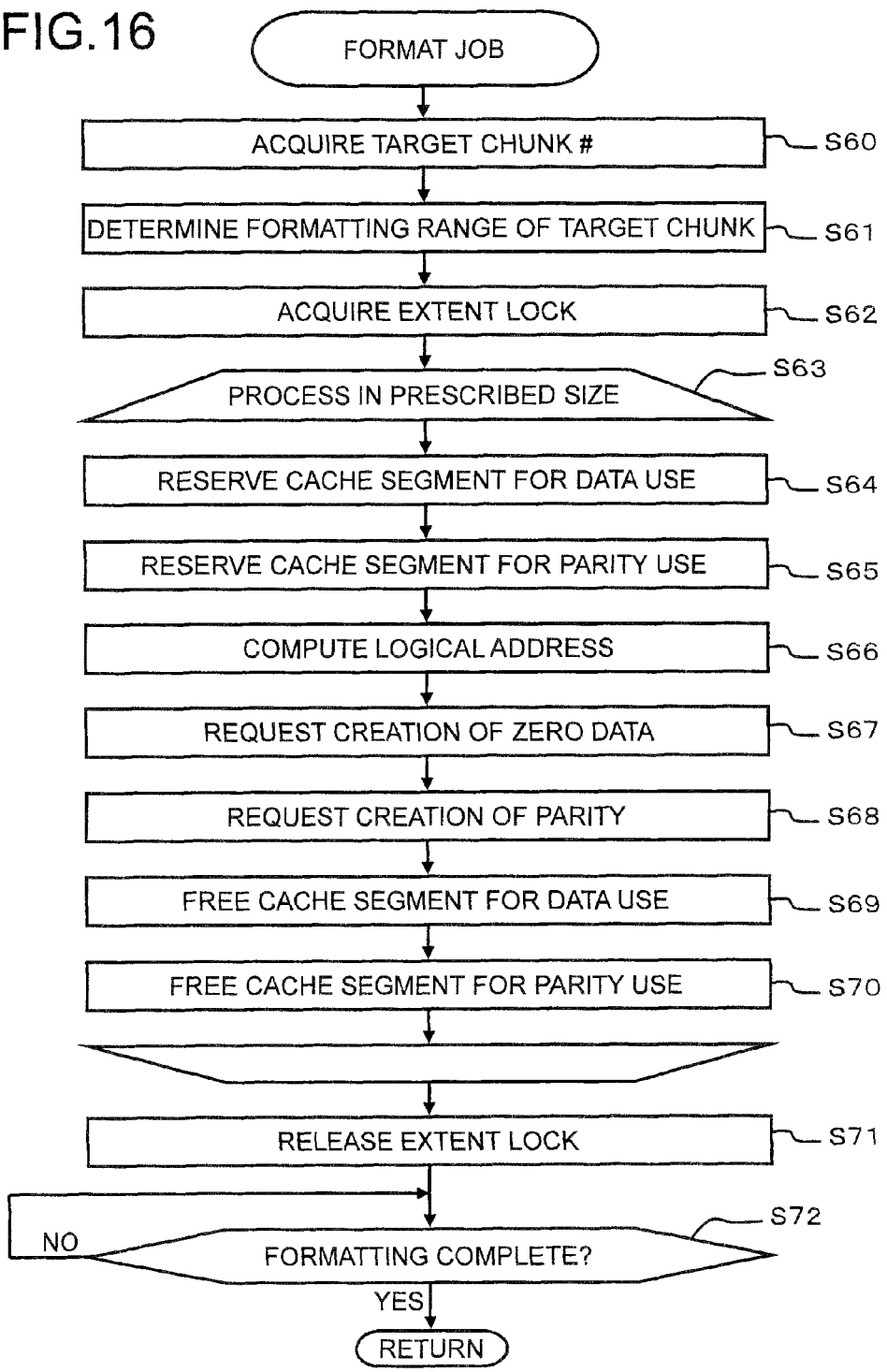
FIG. 16 is a flowchart showing a portion of a formatting process.

The process for formatting a chunk 91 will be explained on the basis of FIGS. 15 and 16. FIG. 15 shows the formatting process in its entirety, and FIG. 16 shows a portion of the formatting process.

The controller 30 checks the waiting-to-be-formatted chunk queue Q10 to determine whether or not there are chunks 91 waiting to be formatted (S50). In a case where chunks 91 are registered in the waiting-to-be-formatted chunk queue Q10 (S50: YES), the controller 30 selects the chunks in round-robin fashion in each RAID group 90 inside the pool unit 60, and executes the following Steps S51 through S54.

The selection method will be explained using the example shown in FIG. 14. After selecting one chunk 91 (1-1) from the first RAID group 90 (#1), the controller 30 selects another one chunk 91 (2-1) from the second RAID group 90 (#2), and, in addition, selects yet another one chunk 91 (3-1) from the third RAID group 90 (#3). Steps S52 through S54, which will be explained below, are respectively executed for the selected chunks 91 (1-1), 91 (2-1), 91 (3-1). S52 through S54 are also executed for the set of chunks 91 (1-2), 91 (2-2), 91 (3-2). Furthermore, S52 through S54 are also executed for the set of chunks 91 (1-3), 91 (2-3), 91 (3-3). The same holds true hereinafter.

The controller 30 selects one chunk 91 of the target RAID group 90 from the waiting-to-be-formatted chunk queue Q10 and dequeues this selected chunk from the waiting-to-be-formatted chunk queue Q10 (S52). The controller 30 enqueues the selected chunk 91 in the waiting-for-processing-to-end chunk queue Q20 (S53), and executes a formatting job for the selected chunk 91 (S54). The formatting job will be explained in detail together with FIG. 16 further below.

When the formatting job is complete, the controller 30 dequeues the formatted chunk 91 from the waiting-for-processing-to-end chunk queue Q20 (S55), and enqueues this formatted chunk 91 in the unallocated chunk queue Q30 (S56).

FIG. 16 is a flowchart showing the details of the formatting job denoted in S54 of FIG. 15. The controller 30 acquires the identification number of the processing-targeted chunk 91 (S60), and determines the range for formatting the target chunk 91 (S61). Then, the controller 30 acquires an extent lock for the target chunk 91 (S62). In accordance with this, the target chunk 91 is prevented from being used by another program.

The controller 30 executes Steps S64 through S70, which will be explained below, by prescribed size for the target chunk 91 (S63). That is, the controller 30 formats the target chunk 91 by unit areas of a prescribed size.

The controller 30 reserves a cache segment for data use (S64), and next reserves a cache segment for parity use (S65). The cache segment is a unit for managing a storage area of the cache memory 340.

The controller 30 computes the logical address (S66), requests the creation of zero-data (S67), and, in addition, requests the creation of parity (S68). The zero-data is created using the cache segment reserved in S64. The parity is created using the cache segment reserved in S65. The controller 30 frees the cache segment reserved for data use (S69), and, in addition, frees the cache segment reserved for parity use (S70).

The controller 30 releases the extent lock on the target chunk 91 (S71), and after confirming the completion of formatting for the target chunk 91 (S72: YES), returns to the processing of FIG. 15.

Figure 17:
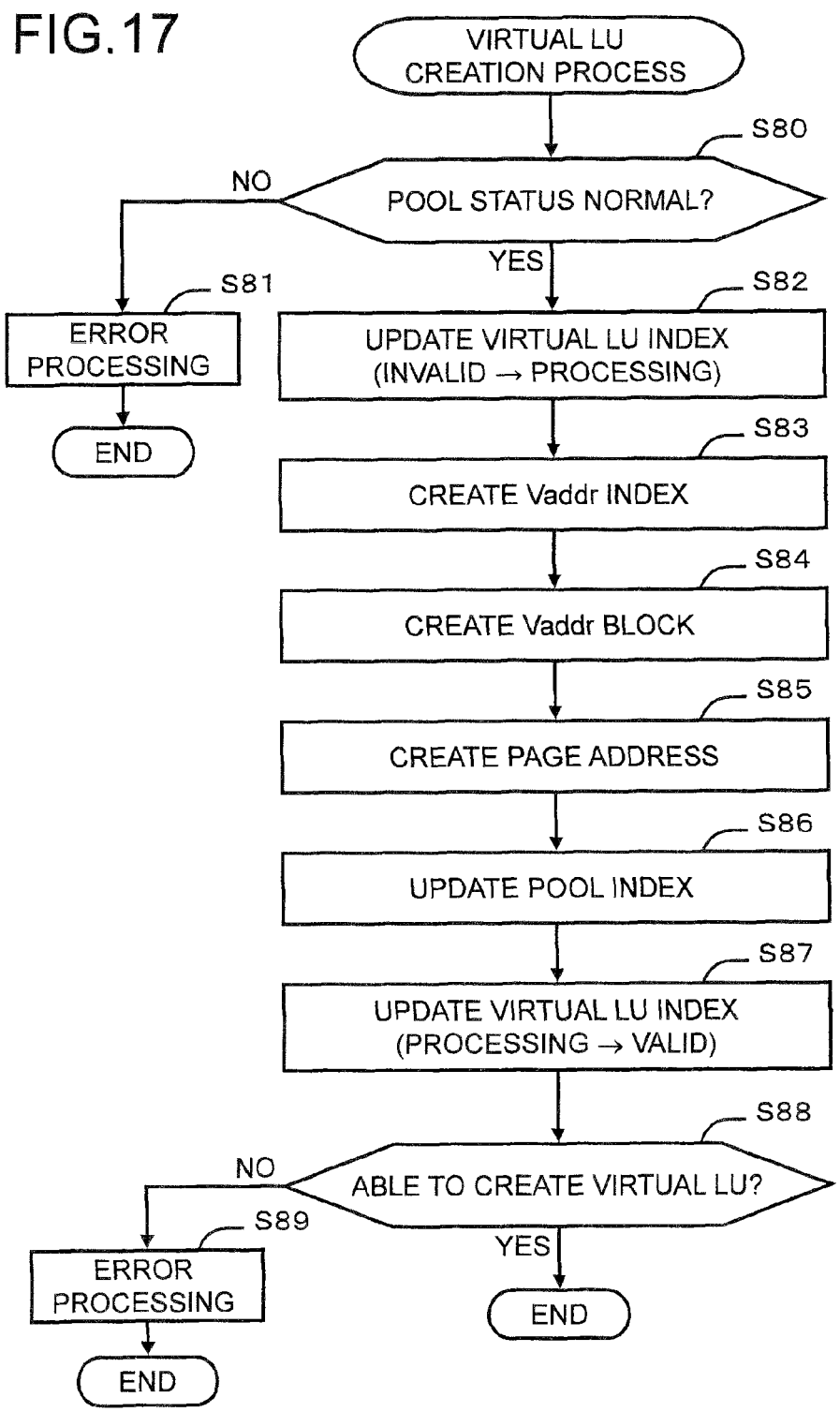
FIG. 17 is a flowchart showing a virtual volume creation process.

FIG. 17 is a flowchart showing the process for creating the virtual volume 50V. The controller 30 determines whether or not the status of the pool unit 60 is normal (S80). In a case in which a failure has occurred in the pool unit 60 (S80: NO), it is not possible to create the virtual volume 50V, and so the controller 30 executes error processing (S81). In the error processing, for example, the controller notifies the user to the effect that the virtual volume 50V is not able to be created because an abnormality has occurred in the pool unit 60.

In a case where the pool unit 60 is normal (S80: YES), the controller 30 changes the status of the virtual volume index 152 from "Invalid" to "Processing" (S82). "Invalid" is preset in the virtual volume identification number prepared beforehand as the initial value of the virtual volume status. This status is changed from "Invalid" to "Processing" during the creation of the virtual volume 50V. When the creation of the virtual volume 50V is complete, this status is changed from "Processing" to "Valid".

The controller 30 creates a virtual address index 153 for the virtual volume 50V for which the status was changed to "Processing" (S83), and, in addition, creates a virtual address block 154 associated with this virtual address index 153 (S84). Furthermore, the controller 30 creates page address information 155 associated with the virtual address block 154 (S85).

The controller 30 updates the in-pool RAID group index 156 (S86), and changes the status of the virtual volume index 152 from "Processing" to "Valid" (S87). The controller 30 checks whether or not it was possible to create the virtual volume 50V normally (S88), and in a case where the virtual volume 50V was able to be created normally (S88: YES), ends this processing. In a case where the virtual volume 50V was not able to be created normally (S88: NO), the controller carries out error processing (S89). In the error processing, for example, the controller notifies the user to the effect that the virtual volume 50V could not be created normally.

Furthermore, for the sake of convenience, the explanation was given as if the determination as to whether or not the virtual volume 50V was able to be created normally is made last, but actually, the determination as to whether or not this virtual volume 50V was able to be created normally is made when each table 151 through 154 is created. Then, in a case where the virtual volume could not be created normally, error processing is formed.

The group of tables shown in FIG. 6 is created by carrying out the processing shown in FIG. 17, and each virtual storage area 500 inside the virtual volume 50V is associated with each page 92 for initialization use. Therefore, the fact that the association of the respective virtual storage areas 500 with the real page 92 was carried out normally is confirmed at the point in time when the virtual volume 50V was normally created.

Figure 18:
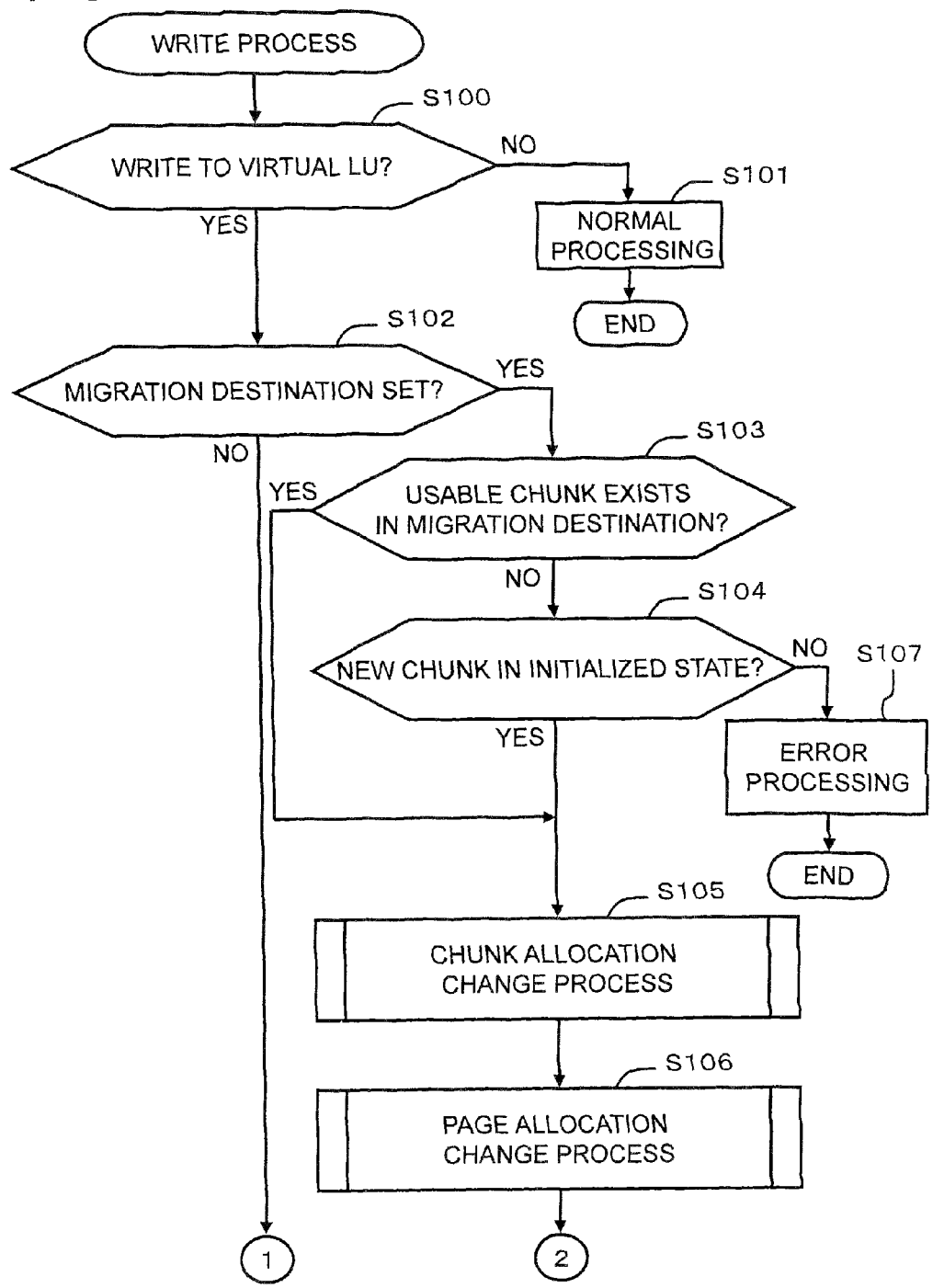
FIG. 18 is a flowchart showing a write process.

FIG. 18 is a flowchart showing the processing of a write command. When a command is received from the host 20, the controller 30 determines whether or not this command is a write command targeted at the virtual volume 50V (S100).

In a case where this command is a write command targeted at the normal volume 50N (S100: NO), the controller 30 executes a normal write process (S101). In a normal write process, for example, write data received from the host 20 is written to the cache memory 340, and when the write-data write to the cache memory 340 is complete, the completion of processing is notified to the host 20. Thereafter, the write data stored in the cache memory 340 is written to a storage device 40 at the appropriate time.

In a case where a write command targeted at the virtual volume 50V has been received (S100: YES), the controller 30 determines whether or not the migration destination has been set to the real page 92 allocated to the write-targeted virtual page 500 by referencing the migration destination management table 160 (S102).

In a case where the migration destination has been set to the real page 92 into which the write data is to be written (S102: YES), the controller 30 determines whether or not there is a usable chunk 91 in the migration-destination RAID group 90 (S103). A usable chunk 91 is one that is already created and is associated with the virtual volume 50V. Using an already created chunk 91 to move a page like this makes it possible to minimize the number of allocated chunks. That is, the storage capacity is able to be used efficiently.

In a case where a usable chunk 91 does not exist (S103: NO), the controller 30 determines whether or not there is a new chunk 91 that is in the initialized state (S104). That is, the controller 30 determines whether or not a new chunk 91 that is capable of being used immediately is available inside the migration-destination RAID group 90.

In a case where a usable new chunk 91 does not exist inside the migration-destination RAID group 90 (S104: NO), the controller 30 carries out error processing (S107). In the error processing, for example, the controller 30 notifies an error message, such as "Insufficient storage capacity" or "Create a RAID group", to the user via the management server 70.

In a case where a usable chunk 91 exists inside the migration-destination RAID group 90 (S103: YES), the controller 30 skips S104 and moves to S105.

The controller 30 executes a chunk allocation change process (S105) and a page allocation change process (S106) to migrate the data stored in the write-targeted real page 92 to the new page 92 provided inside the migration-destination RAID group 90. The chunk allocation change process and the page allocation change process will be explained further below. Thereafter, the controller 30 moves to S114 of FIG. 19.

That is, in Steps S102 through S106, in a case where a write command has been issued for the real page 92 that has been set as the migration destination, the migration-destination page 92 inside the migration-destination chunk 91 is associated with the virtual page 500 that is the target of the write command. In other words, the allocation destination of the write-targeted virtual page 500 is switched from the migration-origination page 92 to the migration-destination page 92.

Figure 19:
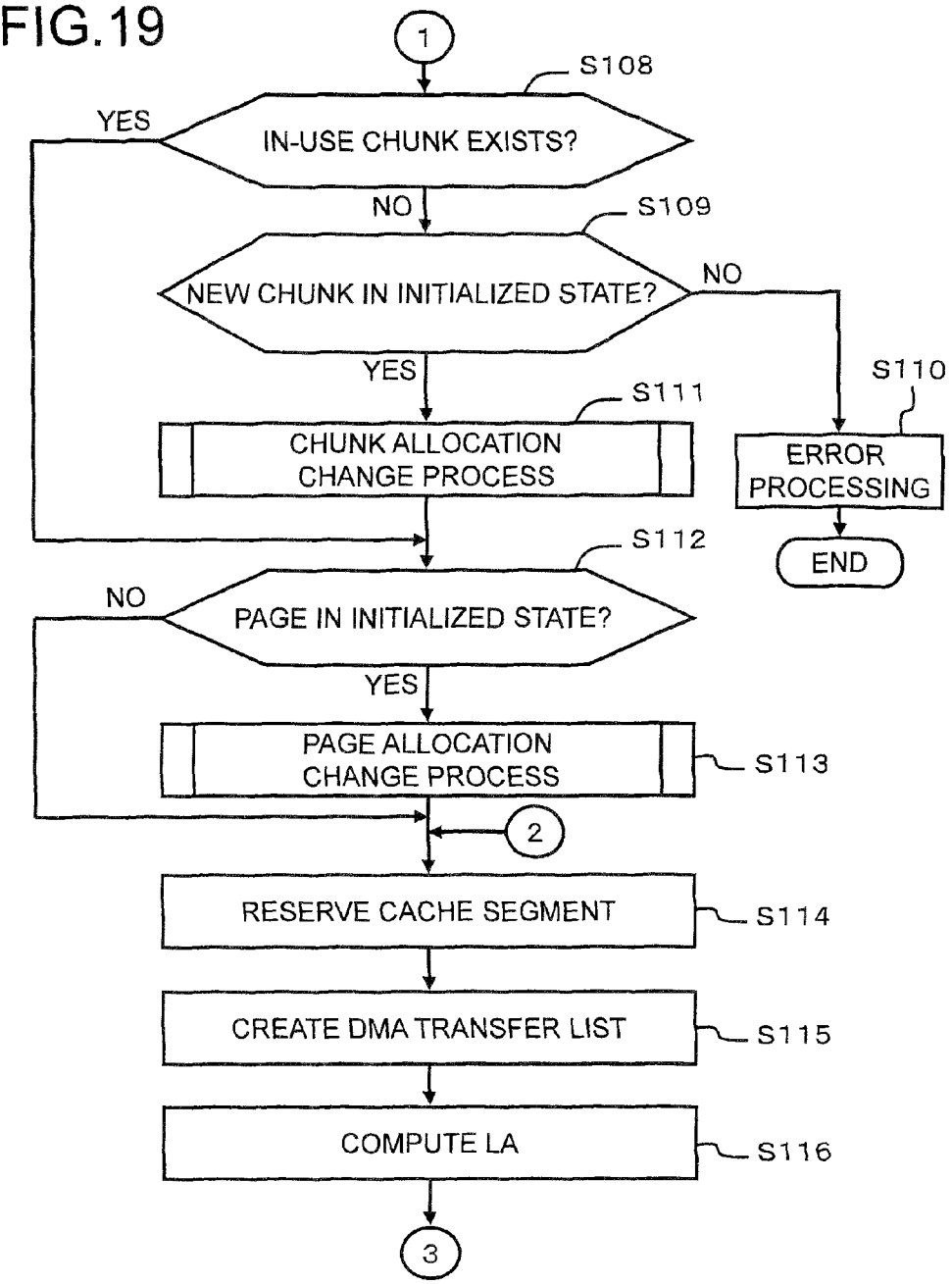
FIG. 19 is a continuation of the flowchart of FIG. 18.

FIG. 19 is a continuation of the flowchart in FIG. 18. In a case where the migration-destination RAID group 90 has not been set to the write-targeted real page 92 (S102: NO), the controller 30 determines whether or not a currently in-use chunk 91 exists in the virtual volume 50V specified in the write command (S108). In a case where an in-use chunk 91 exists (S108: YES), the controller moves to S112, which will be explained below. In a case where an in-use chunk 91 does not exist (S108: NO), the controller 30 determines whether or not there is a chunk 91 in the initialized state to be allocated anew to the virtual volume 50V (S109).

Normally, a new chunk is set to the initialized state by the formatting process shown in FIG. 16. Nevertheless, in a case where a new chunk 91 is not in the initialized state (S109: NO), the controller 30 carries out error processing (5110). In the error processing, for example, the controller notifies the user via the management server 70 to the extent that an initialized chunk 91 does not exist.

In a case where a new chunk 91 is in the initialized state (S109: YES), the controller 30 carries out the chunk allocation change process (5111). The chunk allocation change process will be explained in detail using FIG. 21, but, simply stated, the controller 30 selects one chunk 91 from the unallocated chunk queue Q30, associates this selected chunk 91 with the virtual volume 50V, and changes the status of this chunk 91 to "Allocated (In Use)".

The controller 30 determines whether or not the page 92 to be used from among the respective pages 92 inside the chunk 91 is in the initialized state (S112). In a case where the page 92 to be used is in the initialized state (S112: YES), the controller carries on the page allocation change process (S113).

The page allocation change process will be explained in detail below using FIG. 22. Simply stated, however, in the page allocation change process, the controller 30 changes the status of the page 92 allocated to the virtual volume 50V to "Allocated (In Use)", and updates the virtual address block 154 and the page address information 155. Subsequent to S113, the controller moves to S114.

In a case where the page 92 to be used is not in the initialized state (S112: NO), that is, in a case where the page 92 to be used is not the page for initialization use, the controller 30 skips S113 and moves to S114.

The controller 30 reserves a cache segment for storing the write data (S114), and, in addition, creates a DMA (Direct Memory Access) transfer list for transferring the write data (S115). Then, the controller 30 computes the address part (LA) of the guarantee code (S116).

Figure 20:
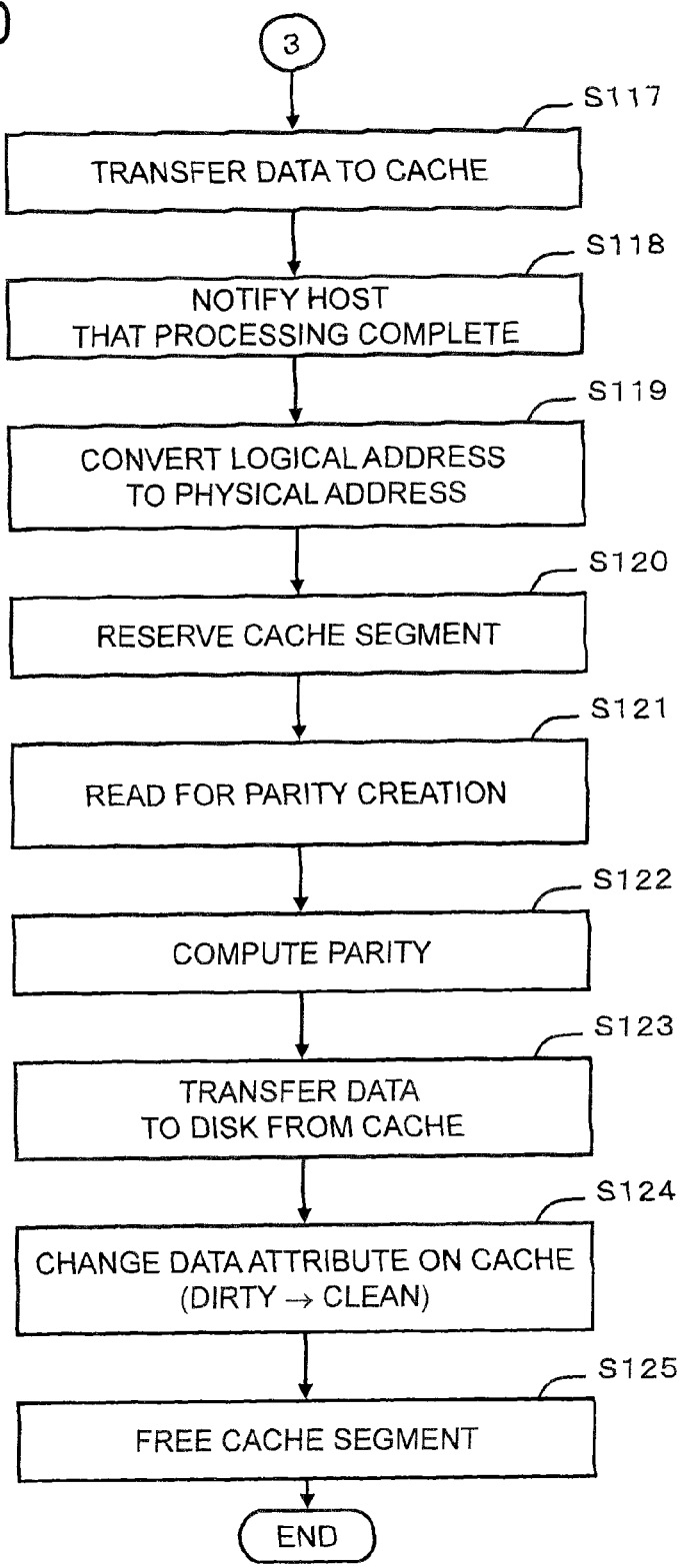
FIG. 20 is a continuation of the flowchart of FIG. 19.

Refer to FIG. 20. The controller 30 performs a DMA transfer of the write data received from the host 20 to the cache memory 340 (S117). After storing the write data in the cache memory 340, the controller 30 notifies the host 20 to the effect that write command processing has been completed (S118).

The method for notifying the host 20 that processing is complete after the write-data write to the cache memory 340 has been completed is called the asynchronous method. By contrast, the method of waiting until the write data has been written to a storage device 40 to notify the host 20 that processing is complete is called the synchronous method. Either one of the asynchronous method or the synchronous method may be used.

The controller 30 converts the logical address specified in the write data to a physical address for storing in the storage device 40 (S119). The controller 30 reserves a cache segment (S120). The controller 30 reads out the old data needed for creating parity from the storage device 40 (S121), and stores this read-out old data in the cache segment reserved in S120.

The controller 30 computes a new parity based on the old data read out from the storage device 40 and the write data received from the host 20 (S122). The controller 30 transfers and stores the write data stored in the cache memory 340 into the storage device 40 (expressed as a disk in FIG. 20) (S123).

The controller 30 changes the status of the write data stored in the cache memory 340 from "Dirty" to "Clean" (S124). The "Dirty" status denotes a state in which the write data is only stored in the cache memory 340. The "Clean" status denotes a state in which the write data has been written to the storage device 40. Lastly, the controller 30 frees the cache segments reserved in S114 and S120, and ends this processing (S125).

As described above, in a case where the migration destination has been set to the write-targeted real page 92 (the migration-origination page), the virtual page 500 associated with this migration-origination page 92 is associated anew with the migration-destination page 92 in accordance with Steps S102 through S106. Therefore, in Steps S119 through S125, the write data is written to the migration-destination page 92. In accordance with this, it is possible to migrate the migration-targeted data from the migration-origination page 92 to the migration-destination page 92 while processing the write command.

Figure 21:
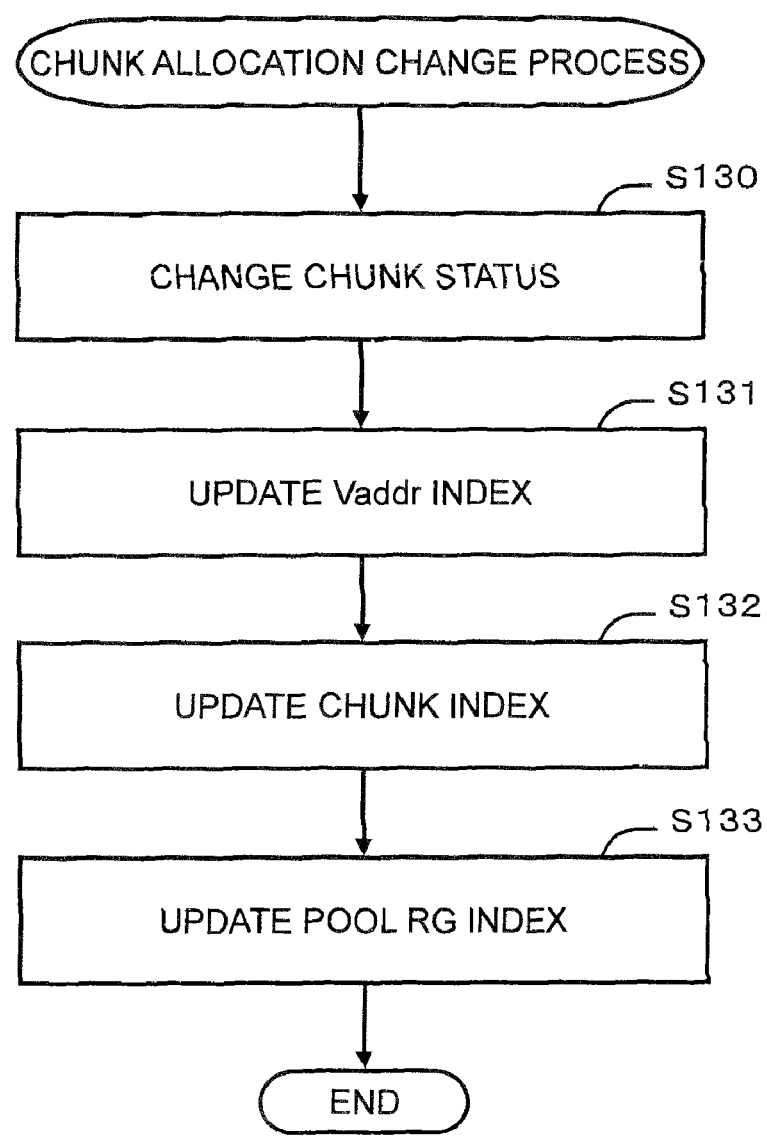
FIG. 21 is a flowchart showing a process for allocating a chunk to the virtual volume.

FIG. 21 is a flowchart showing the details of the chunk allocation change process shown in S105 of FIG. 18 and S111 of FIG. 19. The controller 30 changes the status of the processing-targeted chunk 91 to a prescribed status (S130).

For example, in a case where a new chunk 91 is to be allocated to the virtual volume 50V, the status of the new chunk 91 is changed from "Unallocated (Unused)" to "Allocated (In Use)". Also, for example, in a case where the chunk 91 allocated to the virtual volume 50V is to be freed, the status of this chunk 91 is changed from "Allocated (In Use)" to "Waiting to be Formatted".

After changing the status of the chunk 91, the controller 30 updates the virtual address index 153 corresponding to this chunk 91 (S131). Furthermore, the controller 30 updates the chunk index 157 (S132), and next updates the in-pool RAID group index 156 (S133).

Figure 22:
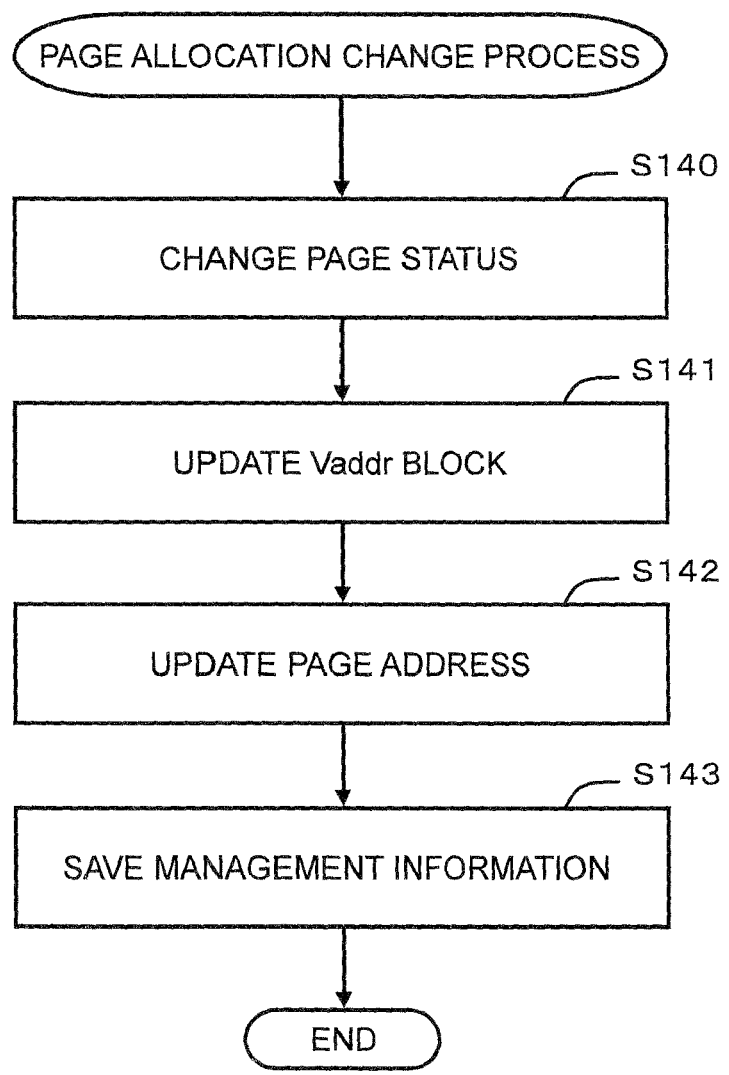
FIG. 22 is a flowchart showing a process for allocating a page to the virtual volume.

FIG. 22 is a flowchart showing the details of the page allocation change process shown in S106 of FIG. 18 and S113 of FIG. 19. The controller 30 changes the status of the processing-targeted page 92 to a prescribed status (S140). For example, in a case where the a new page 92 is to be allocated to the virtual storage area 500 inside the virtual volume 50V, the status of this new page 92 is changed from "Unallocated (Unused)" to "Allocated (In Use)". Also, in a case where a page 92 allocated to the virtual volume 50V is to be freed, for example, the status of this allocated page 92 is changed from "Allocated (In Use)" to "Waiting to be Formatted". The method for allocating a new page 92 to the virtual volume 50V will be explained in detail further below using FIG. 23.

After changing the page status, the controller 30 updates the virtual address block 154 corresponding to the processing-targeted page 92 (S141), and, in addition, updates the page address information 155 corresponding to the processing-targeted page 92 (S142). Then, the controller 30 saves the management information (the group of tables shown in FIG. 6) to the management information save area (refer to S23 of FIG. 11) (S143).

Figure 23:
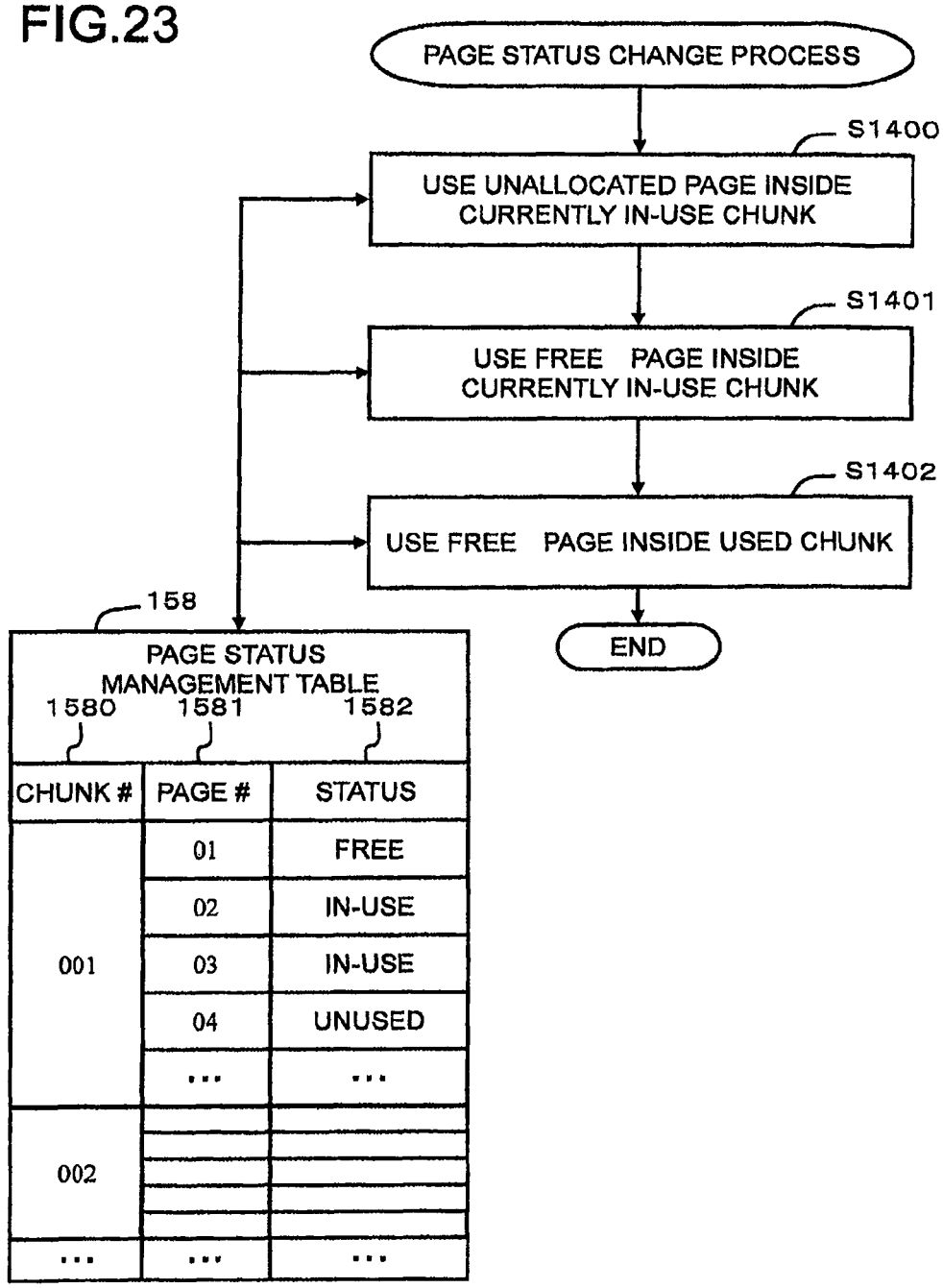
FIG. 23 is a flowchart showing a process for changing a page status.

FIG. 23 is a flowchart showing one portion of the processing shown in S140 of FIG. 22. As explained above, a real storage area is allocated in chunk units to the virtual volume 50V in accordance with a write command from the host 20, and the real pages 92 inside this allocated chunk 91 are utilized in order. When the allocated chunk 91 has been used up, a new chunk 91 is allocated to the virtual volume 50V. The method for using a page 92 will be explained below while referring to FIG. 23.

The controller 30 provides a page status management table 158 for managing the status of each page 92. This table 158, for example, comprises a column 1580 for a chunk identification number, a column 1581 for a page identification number, and a column 1582 showing the status of a page.

For example, any one status, of prepared statuses, such as "In Use (or Allocated)", "Unused (or Unallocated)", "Free (or Waiting to be Formatted)" is set in the page status column 1582. Furthermore, for convenience of explanation, the page status management table 158 makes it appear like page address information 155 as separate information, but in actuality the status of each page is able to managed using only the page address information 155.

The controller 30 references the table 158, and in a case where there is an unused page 92 inside a chunk 91 that is currently in use, makes use of this unused page 92 (S1400). In a case where an unused page 92 does not exist inside a chunk 91 that is currently in use, the controller 30 references the table 158 and in a case where there is a free page 92 inside a chunk 91 that is currently in use, makes use of this free page 92 (1401).

In a case where there are neither an unused page 92 nor a free page 92 inside a chunk 91 that is currently in use, the controller 30 references the table 158 and uses the free page inside the used chunk 91 (S1402). That is, the controller 30 detects and reuses a page 92 that has been freed from a chunk 91 that is already being used in the target virtual volume 50V.

In a case where a free page 92 does not exist inside a used chunk 91, the controller 30 associates an unused chunk 91 with the virtual volume 50V, and allocates the first page 92 of this chunk 91 to the virtual volume 50V as described in FIG. 19.

Figure 24:
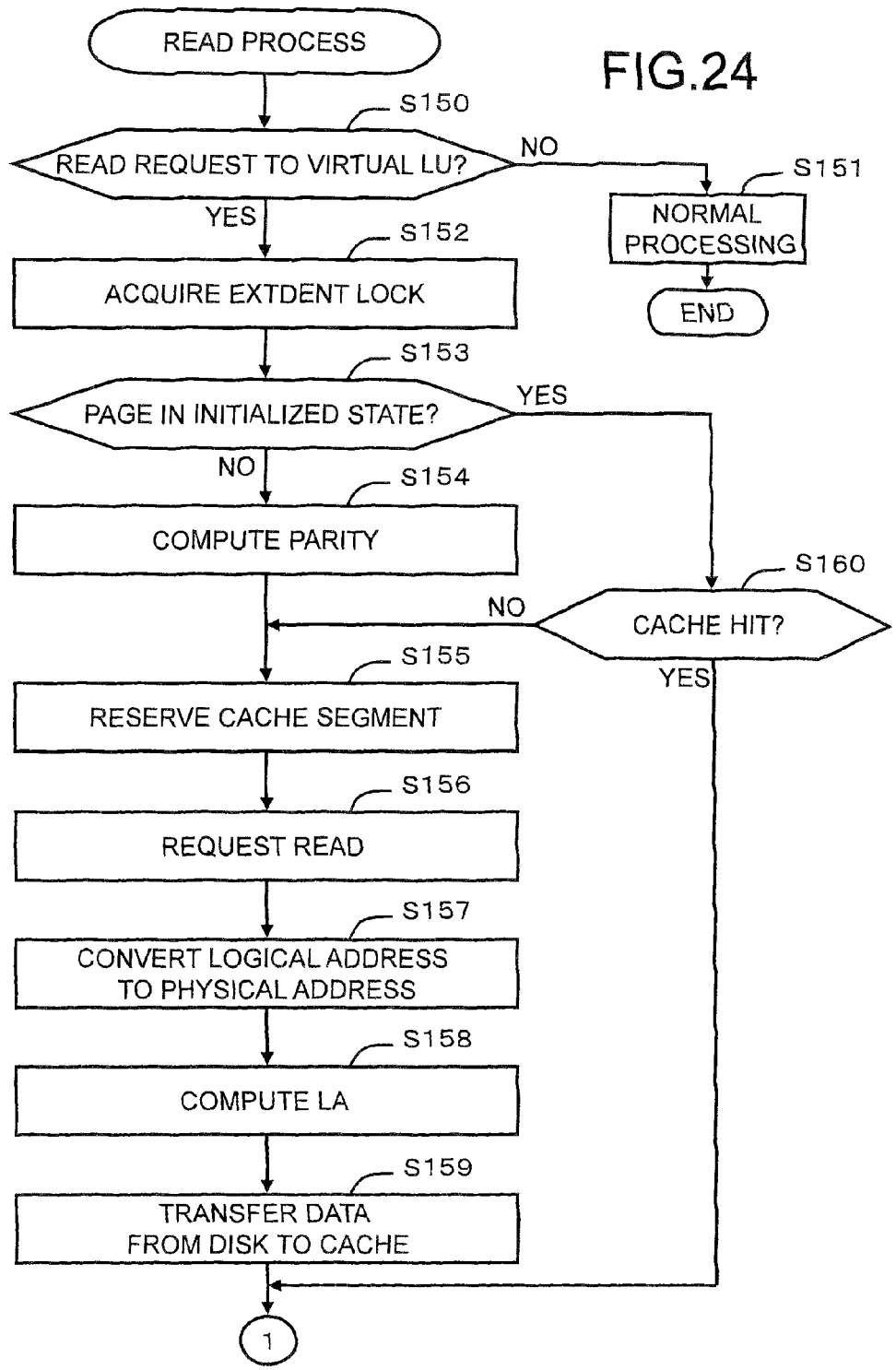
FIG. 24 is a flowchart showing a read process.

FIG. 24 is a flowchart showing the processing of a read command. The controller 30 determines whether or not the command received from the host 20 is a read command targeted at the virtual volume 50V (S150).

In a case where the command received from the host 20 is a read command with respect to the normal volume 50N (S150: NO), the controller 30 executes a normal read process (S151). For example, the controller 30 determines whether or not the data requested by the host 20 is stored in the cache memory 340. In a case where the requested data exists on the cache memory 340, the controller 30 reads the data from the cache memory 340 and sends this read-out data to the host 20. In a case where the host 20-requested data does not exist on the cache memory 340, the controller 30 reads the data from a storage device 40, stores this data on the cache memory 340, and sends this data to the host 20.

In a case where the command issued from the host 20 is a read command for reading out data from the virtual volume 50V (S150: YES), the controller 30 acquires an extent lock for the read-targeted virtual volume 50V (S152).

The read command specifies a logical address as the data read destination. The controller 30 detects the virtual storage area 500 corresponding to the specified logical address, references the group of tables shown in FIG. 6, and acquires the status of the page 92 that has been allocated to this virtual storage area 500. The controller 30 determines whether or not the status of the read-targeted page 92 is the "Initialized State" (S153).

In a case where the read-targeted page 92 is in the initialized state (S153: YES), the controller 30 determines whether or not the NULL data to be sent to the host 20 is stored on the cache memory 340 (S160). As described in S30 of FIG. 11, the NULL data is pre-stored in a prescribed cache segment of the cache memory 340 when the pool unit 60 is created. Therefore, under normal circumstances, the controller makes a determination of "YES" in S160, and moves to S161, which will be explained below. In a case where the NULL data has not been stored on the cache memory 340 (S160: NO), the controller moves to below-explained S155, reads the NULL data from a prescribed page of a prescribed chunk (for example, the page for initialization use), and sends this read-out NULL data to the host 20 (S155 through S159, S171 through S174).

Return to S153. In a case where the read-targeted page 92 is not in the initialized state (S153: NO), that is, in a case where write data has been written to the read-targeted page, the controller 30 computes the parity related to the read-targeted data (S154). Then, the controller 30 reserves a cache segment (S155) and issues a read request to the second communication circuit 320 (S156). The controller 30 converts the logical address to a physical address (S157), and computes the address part (LA) of the guarantee code (S158). The controller 30 migrates the read-targeted data to the cache memory 340 from the storage device 40 by way of the second communication circuit 320 (S159).

Figure 25:
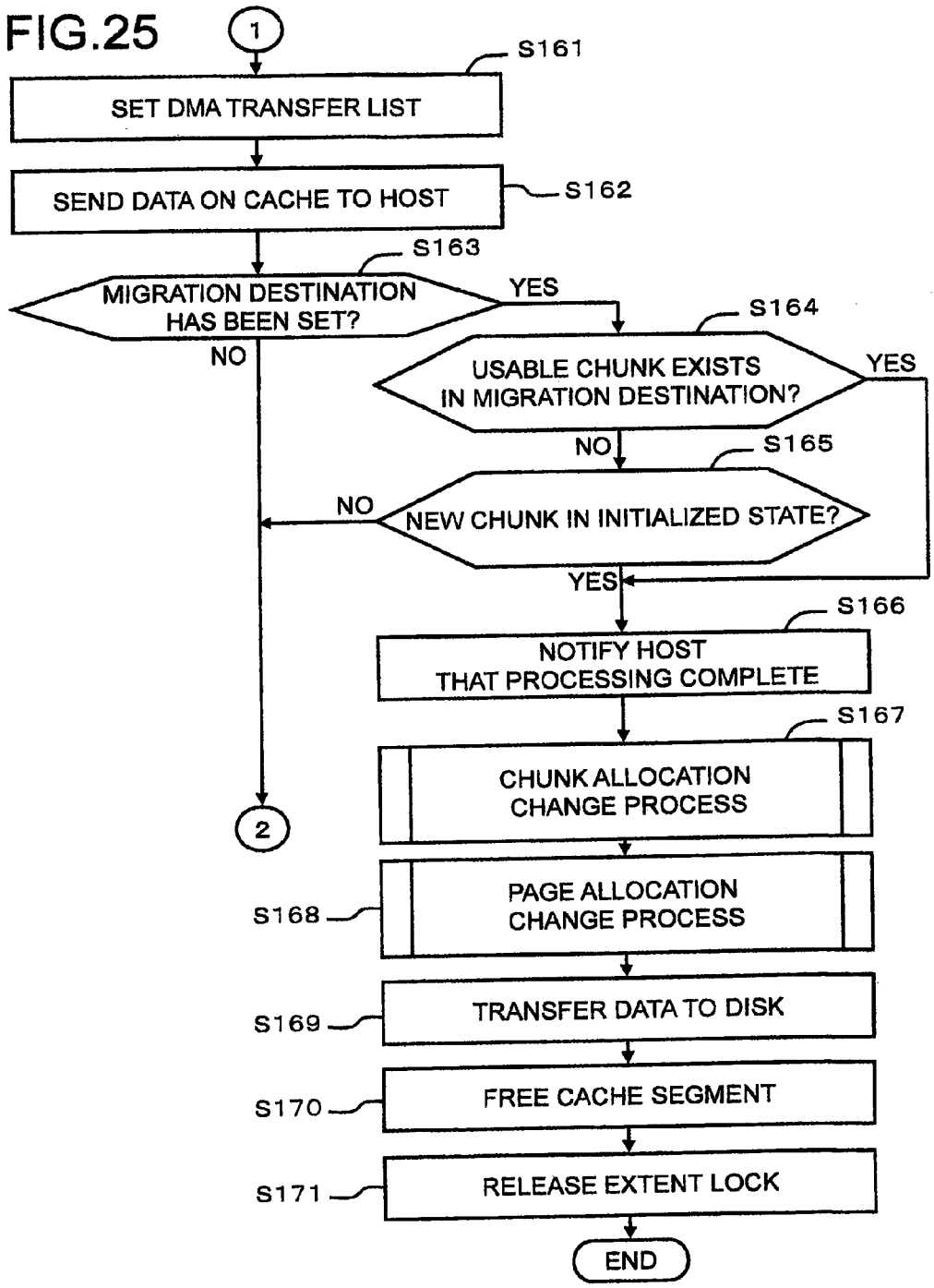
FIG. 25 is a continuation of the flowchart of FIG. 24.
Figure 26:
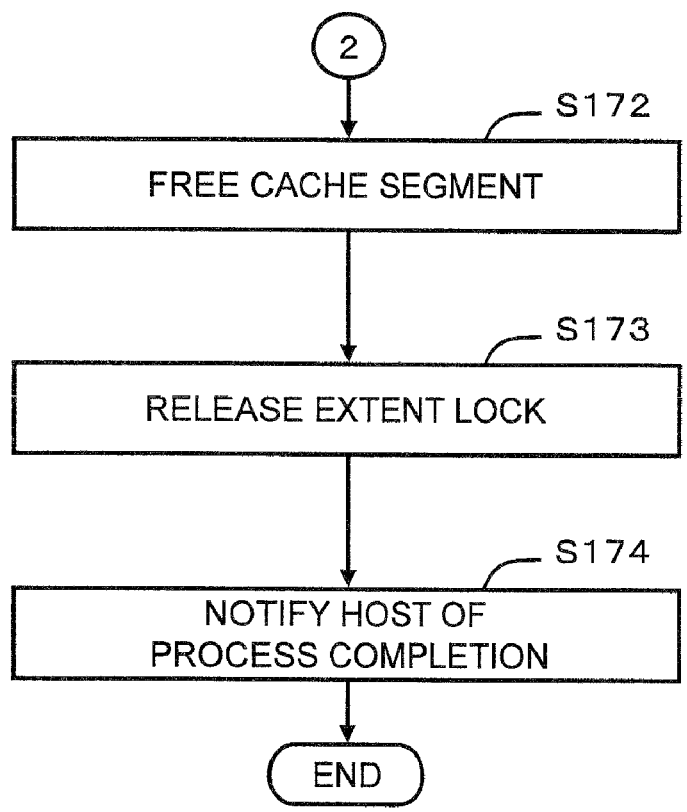
FIG. 26 is a continuation of the flowchart of FIG. 25.

Proceed to FIG. 25. The controller 30 sets a DMA transfer list for carrying out a DMA transfer from the cache memory 340 to the first communication circuit 310 (S161). Next, the controller 30 sends the data stored on the cache memory 340 to the host 20 via the first communication circuit 310 (S162). Then, the controller 30 determines whether or not the migration-destination RAID group 90 is set to the real page 92 associated with the virtual page 500 related to the read command (S163). In a case where the migration-destination RAID group 90 is not set to the read-targeted real page 92 (S163: NO), processing moves to the flowchart shown in FIG. 26.

In a case where the migration-destination RAID group 90 is set to the read-targeted real page 92 (S163: YES), the controller 30 determines whether or not there is a usable chunk 91 in the migration-destination RAID group 90 (S164). In a case where a usable chunk 91 does not exist (S164: NO), the controller determines whether or not a new chunk 91 exists in the initialized state in the migration-destination RAID group 90 (S165).

In a case where a new chunk 91 in the initialized state does not exist in the migration-destination RAID group 90 (S165: NO), the controller 30 shifts processing to the flowchart shown in FIG. 26. This is because it is not possible to migrate the migration-targeted data to the migration-destination RAID group 90.

Alternately, in a case in which either a usable chunk 91 exists inside the migration-destination RAID group 90 (S164: YES) or the migration-destination RAID group 90 has a new chunk 91 in the initialized state (S165: YES), the controller 30 notifies the host 20 to the effect that read command processing is complete (S166).

Furthermore, the controller 30 executes the following steps to migrate the read-out data inside the migration-destination RAID group 90. The controller 30 executes the chunk allocation process (S167) described using FIG. 21, and the page allocation change process (S168) described using FIG. 22. In accordance with this, the read-targeted virtual page 500 is associated from the migration-origination page 92 to a new page 92 inside the migration-destination RAID group 90.

The controller 30 migrates and writes the data on the cache memory 340 to the storage device 40 (S169). The controller 30 frees the cache segment (S170), and, in addition, releases the extent lock (S171).

Alternately, in a case where the migration-destination RAID group 90 is not set to the read-targeted real page 92 (S163: NO), the controller moves to the processing of FIG. 26.

The controller 30 frees the cache segment reserved in S155 (S172), and releases the extent lock (S173). Lastly, the controller 30 notifies the host 20 to the effect that the read command processing is complete (S174) and ends this processing.

In this way, the controller 30 migrates the migration-targeted data to the preset migration destination while processing the read command. Accordingly, the method for determining the migration destination will be explained.

Figure 27:
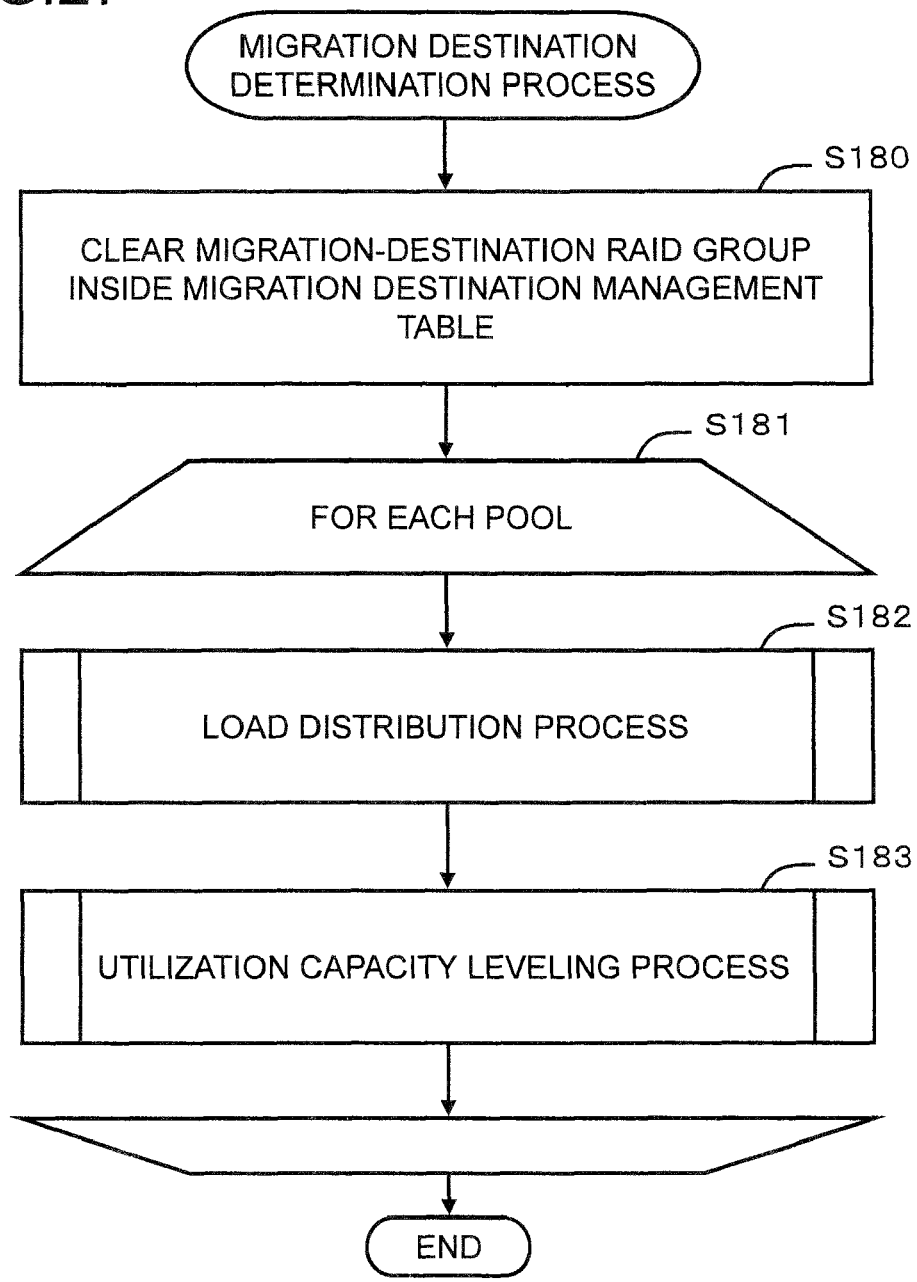
FIG. 27 is a flowchart of a process for determining a migration destination.

FIG. 27 is a flowchart showing the process for determining the migration destination. This process may also be called the process for reallocating data. This process, for example, is executed in each of a preset prescribed period. Or, it is also possible to execute this process in accordance with an instruction from the user.

The controller 30 clears information related to the migration-destination RAID group 90 set in the migration destination management table 160 (S180). That is, prior to creating a new data migration plan, the controller resets the data migration plan created the previous time. The process for distributing the load (S182) and the process for leveling the utilization capacity (S183) are carried out for each pool unit 60 (S181).

Figure 28:
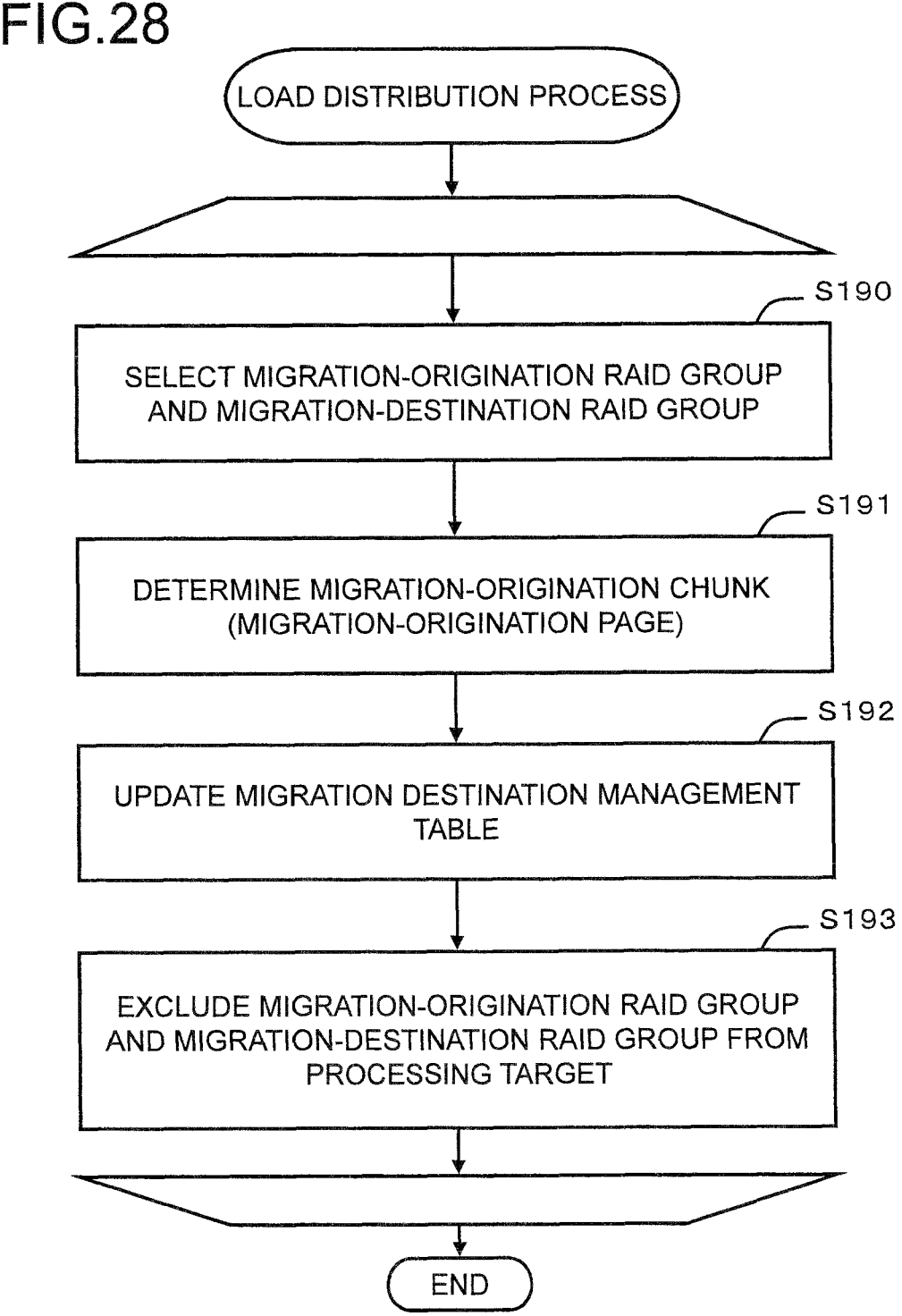
FIG. 28 is a flowchart showing a load distribution process.

FIG. 28 is a flowchart of the load distribution process shown in S182 of FIG. 27. The controller 30 selects the migration-origination RAID group 90 and the migration-destination RAID group 90 in accordance with a preset condition (S190).

For example, the controller 30 selects as the migration-destination RAID group the RAID group having the lowest load from among RAID groups with a utilization capacity of less than 50%. In addition, the controller 30 selects as the migration-origination RAID group the RAID group having the highest load among the RAID groups.

In a case where a RAID group that satisfies the above-mentioned condition does not exist and it is not possible to determine either one of the migration-origination RAID group or the migration-destination RAID group, the controller 30 escapes from the loop shown in FIG. 28.

The controller 30 determines the migration-origination chunk (S191). In the explanation up to this point, a case in which data is migrated in page units has been described, but it is also possible to migration data in chunk units.

From among the respective chunks belonging to the migration-origination RAID group, the controller 30 determines the migration-origination chunks in order from the chunks having a high load. It is supposed that the total load of the chunks specified in the migration-origination chunk will be less than 50% of the load difference between the RAID groups.

The load of the migration-origination RAID group will decrease, and the load of the migration-destination RAID group will increase in accordance with the migration of the data. By taking into account the load difference between the RAID groups when selecting the migration-origination chunks, it is possible to prevent the load of the migration-origination RAID group from becoming smaller than the load of the migration-destination RAID group as a result of the data migration.

The controller 30 stores the migration-origination RAID group, the migration-destination RAID group and the migration-origination chunks selected using the above-described method in the migration destination management table 160 (S192). The controller 30 excludes the migration-origination RAID group and the migration-destination RAID group selected in S190 as processing targets (S193).

The controller 30 repeats this processing until either the number of RAID groups inside the pool unit 60 becomes 1 or less, or a RAID group that satisfies the above-mentioned condition can no longer be found.

Figure 29:
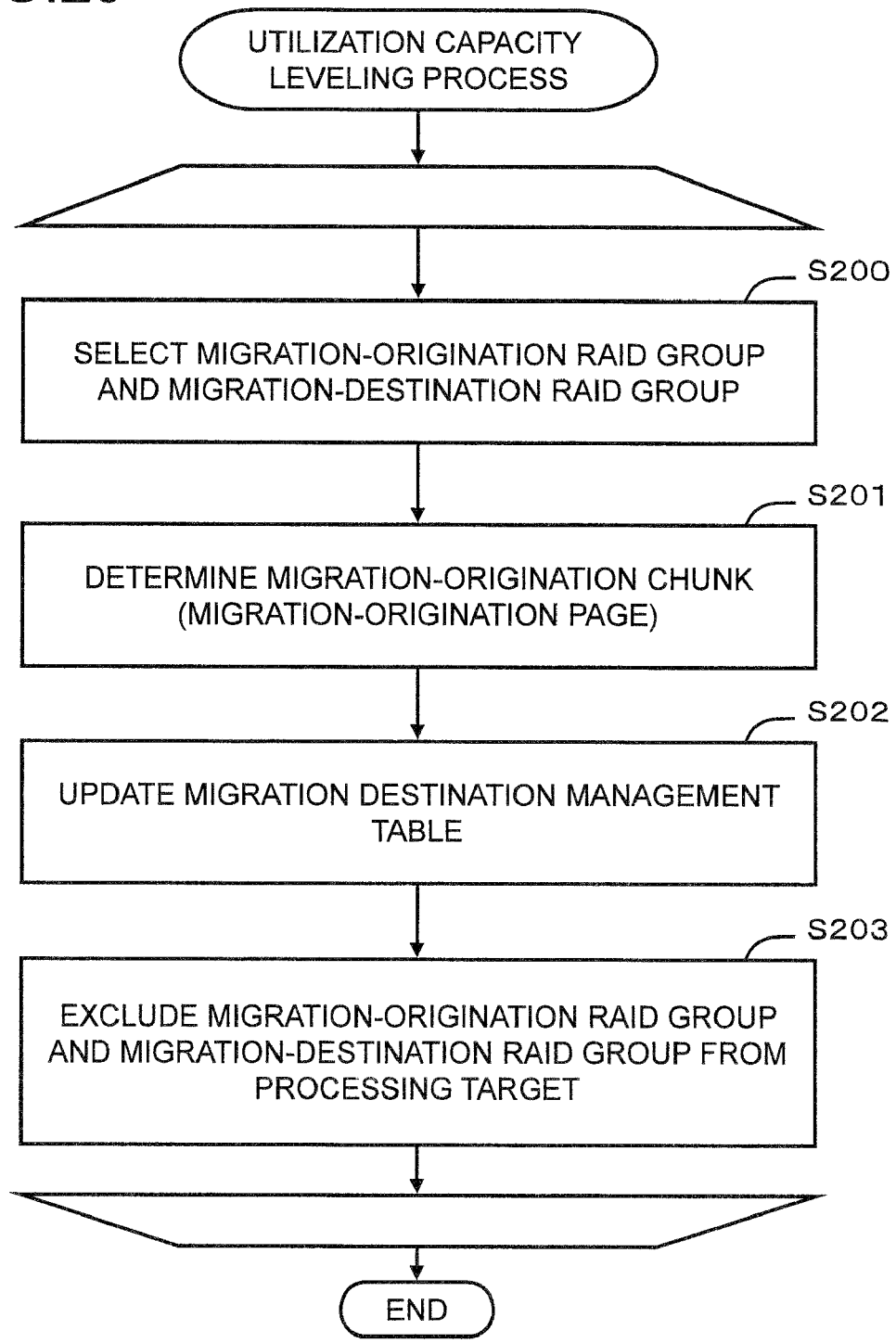
FIG. 29 is a flowchart of a process for leveling the utilization capacity.

FIG. 29 is a flowchart of the utilization capacity leveling process shown in S183 of FIG. 27. The controller 30 selects the migration-origination RAID group 90 and the migration-destination RAID group 90 in accordance with a preset condition (S200).

For example, from among the RAID groups with a utilization capacity of less than 50%, the controller 30 selects as the migration-destination RAID group the RAID group with the smallest utilization capacity. In addition, the controller 30 selects as the migration-origination RAID group the RAID group with the largest utilization capacity of the RAID groups.

In a case where a RAID group that satisfies the above-mentioned condition does not exist and it is not possible to determine either one of the migration-origination RAID group or the migration-destination RAID group, the controller 30 escapes from the loop shown in FIG. 29.

The controller 30 determines the migration-origination chunk (S201). For example, from among the chunks belonging to the migration-origination RAID group, the controller 30 determines the migration-origination chunks in order from the chunks that have yet to be determined as migration destinations and that have a low load. A chunk with a load of 0 will be removed as a selection target.

The number of chunks selected as migration-origination chunks is maintained at less than 50% of the difference in the number of unused chunks between the RAID groups.

Furthermore, in a case where the load of the migration-destination RAID group is higher than the load of the migration-origination RAID group, the number of chunks selected as the migration-origination chunk is held to less than the number of chunks specified as the target destination in the target-destination RAID group.

In this embodiment, which is configured like this, a data migration plan for migrating the data of the real page 92 allocated to the virtual volume 50V is created and stored prior to a host access being generated. In this embodiment, when a host access is generated for migration-targeted data, it is possible to migrate the migration-targeted data while processing a command related to this host access. That is, data migration is carried out during the series of steps for processing a command without executing a special program for data migration separate from the program for command processing.

Therefore, in this embodiment, it is possible to migrate data relatively efficiently using a relatively simple configuration, to utilize the real storage area inside the pool unit 60 substantially uniformly, and to suppress the tendency to access a specific RAID group. In accordance with this, it is possible to prevent the deterioration of response performance in the storage controller 10.

The effect of this embodiment related to the above-described data migration is demonstrated in line with the basic configuration of this embodiment. The basic configuration of this embodiment is a configuration, which allocates a real storage area to the virtual volume 50V in chunk units, and which makes one chunk 91 belong exclusively to one virtual volume 50V.

In this embodiment, as shown in FIGS. 30 (30(a) and 30(b)), it is possible to efficiently utilize the RAID group 90, which is the physical storage area. FIG. 30 is a diagram schematically showing the effect of the present invention. FIG. 30(a) shows a case in which the present invention has not been applied, and FIG. 30(b) shows a case in which the present invention has been applied.

The case of a normal volume 50N will be explained first. In the case of a normal volume 50N, it is possible to use consecutive storage areas inside the RAID group 90. Therefore, data related to a plurality of normal volumes 50N will not be intermixed in a single stripe.

In the case of a virtual volume 50V, a real storage area is allocated as needed, and the data is dispersedly managed. In a case where a real storage area is allocated to the virtual volume in page units, it is necessary to exercise control so that data related to a plurality of virtual volumes is not intermixed in the same stripe. This is because intermixing a plurality of volumes in a single stripe makes the parity creation process complex, increases overhead at data input/output, and lowers the performance of the storage controller.

Accordingly, as shown in FIG. 30(a), a method for storing data so that the start of each page is made to coincide with the start of a stripe is conceivable. According to this method, a situation in which data of different volumes is intermixed inside a single transverse stripe does not occur.

However, in the storage controller 10 of this embodiment, since it is possible to freely set the number of storage devices 40 that configure a RAID group 90, the page size will not always coincide with the stripe size. In a case where the page size and the stripe size do not match, arranging the data so that the start of a page coincides with the start of a stripe gives rise to wasted space as indicated by the white areas in FIG. 30(a). Therefore, the problem is that it is not possible to make effective use of the real storage areas of the RAID group 90 in the method shown in FIG. 30(a), resulting in low utilization efficiency.

Accordingly, as shown in FIG. 30(b), in the present invention, a real storage area is not allocated to the virtual volume in page units, but rather a real storage area is allocated to the virtual volume in chunk 91 units having a plurality of pages. Then, as described above, each time a write command related to the virtual volume 50V is received, the pages 92 inside the chunk 91 are consecutively used. The respective pages 92 inside the chunk 91 are associated with the same virtual volume 50V. Pages 92 related to different virtual volumes are not intermixed inside the same chunk 91. In this way, it is possible to efficiently use the real storage area of the RAID group 90 in accordance with this embodiment.

In this embodiment, as described above, the respective volumes 50V, 50N are managed using consecutive numbers without any particular distinction being made between the identification number of the virtual volume 50V and the identification number of the normal volume 50N. Further, in this embodiment, the RAID group 90 that is used for the virtual volume 50V and the RAID group 90 on which the normal volume 50N is provided are managed with consecutive numbers without making any particular distinction between them. Therefore, the storage controller 10 of this embodiment is able to manage the virtual volume 50V and the normal volume 50N in common using a relatively simple control architecture, and to intermix the two volumes 50V, 50N.

In the present invention, chunks 91 are selected in order from a plurality of RAID groups 90 and allocated to the virtual volume 50V. Therefore, it is possible to make the loads of the respective RAID groups 90 inside the pool unit 60 uniform.

In this embodiment, as described using FIGS. 7 and 17, when creating the virtual volume 50V, the respective tables 151 through 155 are associated with one another, and all of the virtual storage areas 500 inside the virtual volume 50V are allocated to a page 92 for initialization use.

Therefore, in this embodiment, it is possible to confirm that the association of the respective virtual storage areas 500 and real pages 92 is carried out normally at the point in time of the normal creation of the virtual volume 50V. That is, in this embodiment, the provisional allocation of the chunks 91 and initialization page 92 to the virtual volume 50V is completed prior to receiving a write command. In accordance with this, it is possible to check in advance, prior to write command receipt, whether or not the virtual volume 50V will operate normally, thereby enhancing reliability and usability.

Furthermore, in this embodiment, in a case where a write command has been received, the association destination of the virtual storage area 500 corresponding to the logical address specified in the write command is determined by simply switching this association destination from the provisionally allocated initialization page 92 to a prescribed page 92 inside a prescribed chunk 91. In accordance with this, it is possible to process a write command relatively quickly and to enhance the response performance of the storage controller 10.

Example 2

A second embodiment will be explained on the basis of FIGS. 31 and 32. This embodiment corresponds to a variation of the first embodiment. Therefore, the explanation will focus on the differences with the first embodiment. When creating the data migration plan, this embodiment frees the real page 92 on which only the NULL data is stored from the virtual volume 50V and returns same to an unused page.

FIG. 31 is a flowchart showing a migration destination determination process according to this embodiment. Compared to the flowchart shown in FIG. 27, this flowchart also comprises a process (S210) for deleting the zero-data (NULL data). In the migration destination determination process, the controller 30 first returns the real page 92 storing only zero-data to an unused page, and thereafter, executes the load distribution process and the utilization capacity leveling process.

FIG. 32 is a flowchart of the zero-data deletion process. The controller 30 carries out the following processing for each RAID group (S2101). The controller 30 detects a page 92 on which only zero-data is stored from among the respective pages 92 of the processing-targeted RAID group 90 (S2102).

The controller 30 associates the virtual page 500 corresponding to the page 92 storing only zero-data with the specified page for initialization use mentioned with regard to FIG. 7 (S2103), and updates the page management table 160 (S2104).

This embodiment, which has the configuration described above, exhibits the same effects as the first embodiment. Furthermore, in this embodiment, the controller 30 frees the real page 92 on which only NULL data is stored and returns this freed real page to an unused real page 92 when the data migration plan is created, thereby making it possible to effectively use the real storage areas inside the pool unit 60. That is, in this embodiment, it is possible to free a page 92 that is being wastefully used among the pages 92 inside the pool unit 60 every time a data migration plan is created.

The present invention is not limited to the above-described embodiments. A person with ordinary skill in the art, for example, will be able to make various additions and changes without departing from the scope of the present invention so as to appropriately combine the above-described embodiments.

REFERENCE SIGNS LIST

1 Storage controller
2 Host
3 Controller
4 Storage device
5(1), 5(2) Virtual volume
5A Virtual storage area
6a, 6b RAID group
7 Chunk
8 Page
10 Storage controller
20 Host
30 Controller
40 Storage device
50V Virtual volume
60 Pool unit 70 Management server
90 RAID group
91 Chunk
92 Page
500 Virtual storage area

The invention claimed is:

1. A storage system, comprising:
a virtual volume;
a plurality of RAID groups including either one or a plurality of storage devices;
a pool unit for managing a plurality of first real storage areas, which are respectively disposed in a stripe shape in each of the RAID groups, and the first real storage areas have a plurality of second real storage areas respectively;
a controller, which, in a case where a write command related to the virtual volume is issued from a higher-level device, selects a prescribed second real storage area from among the respective second real storage areas included in a prescribed first real storage area of the respective first real storage areas, and associates this prescribed second real storage area with a prescribed area inside the virtual volume corresponding to the write command, and which associates one virtual volume with one first real storage area;
a migration destination determination unit, which selects a migration-targeted second real storage area from among the respective second real storage areas associated with the virtual volume, and selects a migration-destination first real storage area, which is to become the migration destination of data stored in the migration-targeted second real storage area, from among the respective first real storage areas inside another RAID group other than the RAID group in which the migration-targeted second real storage area of the respective first real storage areas is disposed;
a migration-destination storage unit which associates the migration-targeted second real storage area with the migration-destination first real storage area, and stores the migration-targeted second real storage area associated with the migration-destination first real storage area; and
a command processor, which, in a case where the higher-level device has issued a command corresponding to the migration-targeted second real storage area, migrates, during command processing, the data stored in the migration-targeted second real storage area to the migration-destination first real storage area stored by the migration-destination storage unit.

2. The storage system according to claim 1, wherein (1) the migration-destination storage unit stores
(1-1) migration-targeted information specifying the migration-targeted second real storage area,
(1-2) migration-destination information specifying the migration-destination first real storage area,
(1-3) load information related to a load of each of the RAID groups, and
(1-4) utilization capacity information related to the utilization capacity of each of the RAID groups,
(2) the migration-destination determination unit,
(2-1) in a case in which either a prescribed time has arrived or an instruction has been issued from the user, deletes the migration-destination information stored in the migration-destination storage unit,
(2-2) frees, from among the respective second real storage areas, the second real storage area in which only NULL data is stored, and changes the second real storage area to an unused second real storage area, and furthermore
(2-3) executes a load distribution process, which is based on the load information, and which creates new migration-destination information for migrating a relatively high-load second real storage area to a relatively low-load first real storage area and stores the new migration-destination information for migrating the relatively high-load second real storage area in the migration-destination storage unit, and
(2-4) executes a utilization capacity leveling process, which is based on the utilization capacity information, and which creates new migration-destination information for migrating a second real storage area inside a first real storage area that has a relatively large utilization capacity to a first real storage area that has a relatively small utilization capacity and stores the new migration-destination information in the migration-destination storage unit, and
(3) the command processor,
(3-1) in a case where a write command with respect to the migration-targeted second real storage area has been issued from the higher-level device, reads out the data stored in the migration-targeted second real storage area, merges this read-out data with write data related to the write command, and writes this merged data into a second real storage area inside the migration-destination first real storage area, and furthermore, notifies the higher-level device to the effect that write command processing has been completed, and
(3-2) in a case where a read command with respect to the migration-targeted second real storage area has been issued from the higher-level device, reads out the data from the migration-targeted second real storage area and sends this data to the higher-level device, and after notifying the higher-level device to the effect that the read command processing has been completed, writes the data that has been read out from the migration-targeted second real storage area to a second real storage area inside the migration-destination first real storage area.

3. The storage system according to claim 1, wherein the command processor, in a case where a write command with respect to the migration-targeted second real storage area has been issued from the higher-level device, reads out the data stored in the migration-targeted second real storage area, merges this read-out data with write data related to the write command, and writes this merged data into a second real storage area inside the migration-destination first real storage area.

4. The storage system according to claim 3, wherein the command processor, in a case where a read command with respect to the migration-targeted second real storage area has been issued from the higher-level device, reads out the data from the migration-targeted second real storage area and sends this data to the higher-level device, and after notifying the higher-level device to the effect that processing of the read command has been completed, writes the data that has been read out from the migration-targeted second real storage area to a second real storage area inside the migration-destination first real storage area.

5. The storage system according to claim 3, wherein
the migration-destination storage unit stores:
migration-targeted information specifying the migration-targeted second real storage area;
migration-destination information specifying the migration-destination first real storage area; and load information related to a load of each the RAID group, and the migration-destination determination unit deletes the migration-destination information stored in the migration-destination storage unit, creates, based on the load information, new migration-destination information for migrating a relatively high-load second real storage area to a relatively low-load first real storage area, and stores the new migration-destination information for migrating the relatively high-load second real storage area in the migration-destination storage unit.

6. The storage system according to claim 5, wherein the migration-destination determination unit, subsequent to deleting the migration-destination information stored in the migration-destination storage unit, frees, from among the respective second real storage areas, the second real storage area in which only NULL data is stored, and changes the second real storage area to an unused second real storage area.

7. The storage system according to claim 3, wherein the migration-destination storage unit stores:

migration-targeted information specifying the migration-targeted second real storage area;

migration-destination information specifying the migration-destination first real storage area;

load information related to a load of each the RAID group, and utilization capacity information related to a utilization capacity of each the RAID group, and the migration-destination determination unit deletes the migration-destination information stored in the migration-destination storage unit, creates, based on the load information, new migration-destination information for migrating a relatively high-load second real storage area to the inside of a relatively low-load first real storage area, and stores the new migration-destination information for migrating the relatively high-load second real storage area in the migration-destination storage unit, and furthermore, creates, in order to migrate a second real storage area inside a first real storage area that has a relatively large utilization capacity to a first real storage area that has a relatively small utilization capacity, new migration-destination information based on the utilization capacity information, and stores the new migration-destination information based on the utilization capacity information in the migration-destination storage unit.

8. The storage system according to claim 1, wherein the migration-destination determination unit selects a plurality of migration-targeted second real storage areas in first real storage area units.

9. The storage system according to claim 1, wherein the controller, in a case of creating the virtual volume, associates respective virtual storage areas inside the virtual volume with a second real storage area for initialization use in which initial data is stored, and in a case where the write command related to the virtual volume has been issued from the higher-level device, switches the association destination of the virtual storage area corresponding to the write command from the second real storage area for initialization use to a selected prescribed second real storage area.

10. The storage systems according to claim 9, wherein the controller associates the unused second real storage area, which follows the second real storage area associated with the virtual volume in accordance with a previous write request, with the virtual volume as the prescribed second real storage area.

11. The storage system according to claim 10, wherein a guarantee code is set in the data stored in the virtual volume for each unit area of a prescribed size, and the guarantee code comprises data for identifying the RAID group, data for identifying the first real storage area, and data for identifying the second real storage area inside the first real storage area.

12. A storage controller, comprising:

a virtual volume;

a plurality of RAID groups comprising either one or a plurality of storage devices;

pool unit for managing a plurality of first real storage areas, which are respectively disposed in a stripe shape in each the RAID group, and which have a plurality of second real storage areas respectively;

a controller, which, in a case where a write command related to the virtual volume has been issued from a higher-level device, selects a prescribed second real storage area from among the respective second real storage areas included in a prescribed first real storage area of the respective first real storage areas, and associates this prescribed second real storage area with a prescribed area inside the virtual volume corresponding to the write command, and which associates one virtual volume with one first real storage area;

a migration-destination determination unit, which selects a migration-targeted first real storage area from among the respective first real storage areas associated with the virtual volume, and selects a migration-destination RAID group that is to be the migration destination of the data stored in this migration-targeted first real storage area from among other RAID groups other than the RAID group in which the migration-targeted first real storage area is disposed;

a migration-destination storage unit, which associates the migration-targeted first real storage area with the migration-destination RAID group and stores the migration-targeted first real storage area associated with the migration-destination RAID group; and a command processor, which, in a case where the higher-level device has issued a command corresponding to the migration-targeted first real storage area, migrates, during command processing, data stored in the migration-targeted first real storage area to the migration-destination RAID group stored by the migration-destination storage unit.

13. A method for controlling a virtual volume to which a real storage area is allocated in accordance with a write command, with the virtual volume having a plurality of virtual storage areas, and a pool unit for managing a plurality of RAID groups being created, and furthermore each the RAID group having a plurality of first real storage areas each having a stripe shape so as to span a plurality of storage devices, and having a plurality of second real storage areas corresponding to the virtual storage areas, the method comprising:

in a case where a write command related to the virtual volume has been issued from the higher-level device, associating a prescribed second real storage area included in a prescribed first real storage area of the respective first real storage areas with the virtual storage area corresponding to the write command so that a plurality of the virtual volumes are not associated with one first real storage area;

storing write data received from the higher-level device in the prescribed second real storage area to be associated with the virtual storage area;

selecting a relatively high-load second real storage area from among the respective second real storage areas associated with the virtual storage areas as the migration-targeted second real storage area;

selecting, as the migration-destination first real storage area that is to be the migration destination of data stored in the migration-targeted second real storage area, a first real storage area, which is one of respective first real storage areas inside another RAID group other than the RAID group where the migration-targeted second real storage area of the respective first real storage areas is disposed, and which has a relatively low load;

associating the migration-targeted second real storage area and the migration-destination first real storage area and storing the migration-targeted second real storage area associated with the migration-destination storage unit; and in a case where the higher-level device has issued a write command corresponding to the migration-targeted second real storage area, reading out data stored in the migration-targeted second real storage area, merging this read-out data with write data related to the write command, and writing this merged data into the second real storage area inside the migration-destination first real storage area.

14. The virtual volume control method according to claim 13, comprising: in a case where a read command with respect to the migration-targeted second real storage area has been issued from the higher-level device, reading out data from the migration-targeted second real storage area and sending this data to the higher-level device, and notifying the higher-level device to the effect that processing of the read command has been completed, thereafter writing the data read out from the migration-targeted second real storage area to the second real storage area inside the migration-destination first real storage area.

* * * * *